US012045700B1

(12) United States Patent
Kirke

(10) Patent No.: US 12,045,700 B1
(45) Date of Patent: Jul. 23, 2024

(54) SYSTEMS AND METHODS OF GENERATIVE MACHINE-LEARNING GUIDED BY MODAL CLASSIFICATION

(71) Applicant: ClioTech Ltd, Manchester (GB)

(72) Inventor: Georgia Helen Kirke, Kent (GB)

(73) Assignee: ClioTech Ltd., Manchester (GB)

( * ) Notice: Subject to any disclaimer, the term of this patent is extended or adjusted under 35 U.S.C. 154(b) by 0 days.

(21) Appl. No.: 18/385,143

(22) Filed: Oct. 30, 2023

(51) Int. Cl.
G06N 20/00 (2019.01)

(52) U.S. Cl.
CPC ................... G06N 20/00 (2019.01)

(58) Field of Classification Search
CPC ..................................... G06N 20/00
See application file for complete search history.

(56) References Cited

U.S. PATENT DOCUMENTS

| | | | | |
|---|---|---|---|---|
| 11,516,158 B1 * | 11/2022 | Luzhnica | ............... | G06F 40/35 |
| 11,868,313 B1 * | 1/2024 | Ryan | ................... | G06F 16/16 |
| 2013/0144605 A1 * | 6/2013 | Brager | .................. | G06F 16/30 |
| | | | | 704/9 |
| 2021/0089934 A1 * | 3/2021 | Thornley | ............. | G06F 40/216 |

FOREIGN PATENT DOCUMENTS

| | | |
|---|---|---|
| CN | 110377890 A | 10/2019 |
| CN | 113301268 A | 8/2021 |

OTHER PUBLICATIONS

Shi, Yong, Mengyu Shang, and Zhiquan Qi. "Intelligent layout generation based on deep generative models: A comprehensive survey." Information Fusion (Jul. 23, 2023): 101940. (Year: 2023).*
Designrr: Create, Design & Launch Stunning eBooks and Reports in 2 Minutes Without Writing a Word, (Website), (Publication date: Not available, Printed date: Jul. 28, 2023), URL: https://go2.designrr.io/wordgenie2?utm_campaign=1143159503&utm_source=g&gc_id=1143159503&utm_medium=cpc&utm_content=&utm_term=ebook%20creator&h_ad_id=661395942470&gad=1&gclid=CjwKCAjwq4imBhBQEiwA9Nx1BqZNWhfGdtccsrx8WMx10yzw2M.

* cited by examiner

*Primary Examiner* — Casey R. Garner
(74) *Attorney, Agent, or Firm* — Caldwell Intellectual Property Law

(57) ABSTRACT

Described herein are systems and methods of generative machine-learning guided by modal classification. An apparatus may receive a characterization datum and output an inquiry as a function of the characterization datum. An apparatus may receive an inquiry response and may output a plurality of draft literature modes as a function of the characterization datum and the inquiry response. An apparatus may receive template feedback and may output a literature mode as a function of the template feedback and the plurality of draft literature modes.

18 Claims, 7 Drawing Sheets

SYSTEMS AND METHODS OF GENERATIVE MACHINE-LEARNING GUIDED BY MODAL CLASSIFICATION

FIELD OF THE INVENTION

The present invention generally relates to the field of machine learning. In particular, the present invention is directed to generative machine-learning guided by modal classification.

BACKGROUND

Currently, generative machine learning models for producing written content are typically limited to producing text, and lack the ability to produce additional features such as images, font choice, and chapter heading style in a satisfactory manner.

SUMMARY OF THE DISCLOSURE

In an aspect, an apparatus for generative machine-learning guided by modal classification may include at least a processor; and a memory communicatively connected to the at least processor, the memory containing instructions configuring the at least processor to receive a characterization datum from a user device operated by a user; generate an inquiry as a function of the characterization datum; communicate the inquiry to the user device; receive an inquiry response from the user device; generate a plurality of draft literature modes using a literature mode machine learning model as a function of the characterization datum and the inquiry response; communicate the plurality of draft literature modes to the user device; receive template feedback from the user device; and determine a literature mode as a function of the plurality of draft literature modes and the template feedback.

In another aspect, a method for generative machine-learning guided by modal classification may include using at least a processor, receiving a characterization datum from a user device operated by a user; using at least a processor, generating an inquiry as a function of the characterization datum; using at least a processor, communicating the inquiry to the user device; using at least a processor, receiving an inquiry response from the user device; using at least a processor, generating a plurality of draft literature modes using a literature mode machine learning model as a function of the characterization datum and the inquiry response; using at least a processor, communicating the plurality of draft literature modes to the user device; using at least a processor, receiving template feedback from the user device; and using at least a processor, determining a literature mode as a function of the plurality of draft literature modes and the template feedback.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for generative machine-learning guided by modal classification. Literature design generation using the systems and methods described herein may allow computer systems to generate more complete works of literature. In some embodiments, this may overcome limitations in preexisting generative machine learning models for producing written content, which are typically restricted to outputting text. Using the systems and methods described herein, literature layouts and art elements may be generated to accompany written content, such as artificial intelligence (AI) generated written content. This may allow AI to produce better, more convincing, and more human-like written content.

Layouts and/or artwork to be associated with literature may be produced using the systems and methods described herein. This may be combined with literature content to produce a literature item. Layouts and/or artwork may be generated using machine learning techniques. An apparatus may receive text characterization data from a user and may ask inquiries of the user to gather additional data. This communication with a user may be done using a chatbot. Once sufficient data has been gathered, apparatus may generate a plurality of draft literature modes. This may be done using one or more additional machine learning models. Apparatus may receive additional feedback from a user based on these draft literature modes. For example, a user may select a template and/or may suggest a modification to a template. Apparatus may generate a literature mode as a function of this feedback.

Figure 1:
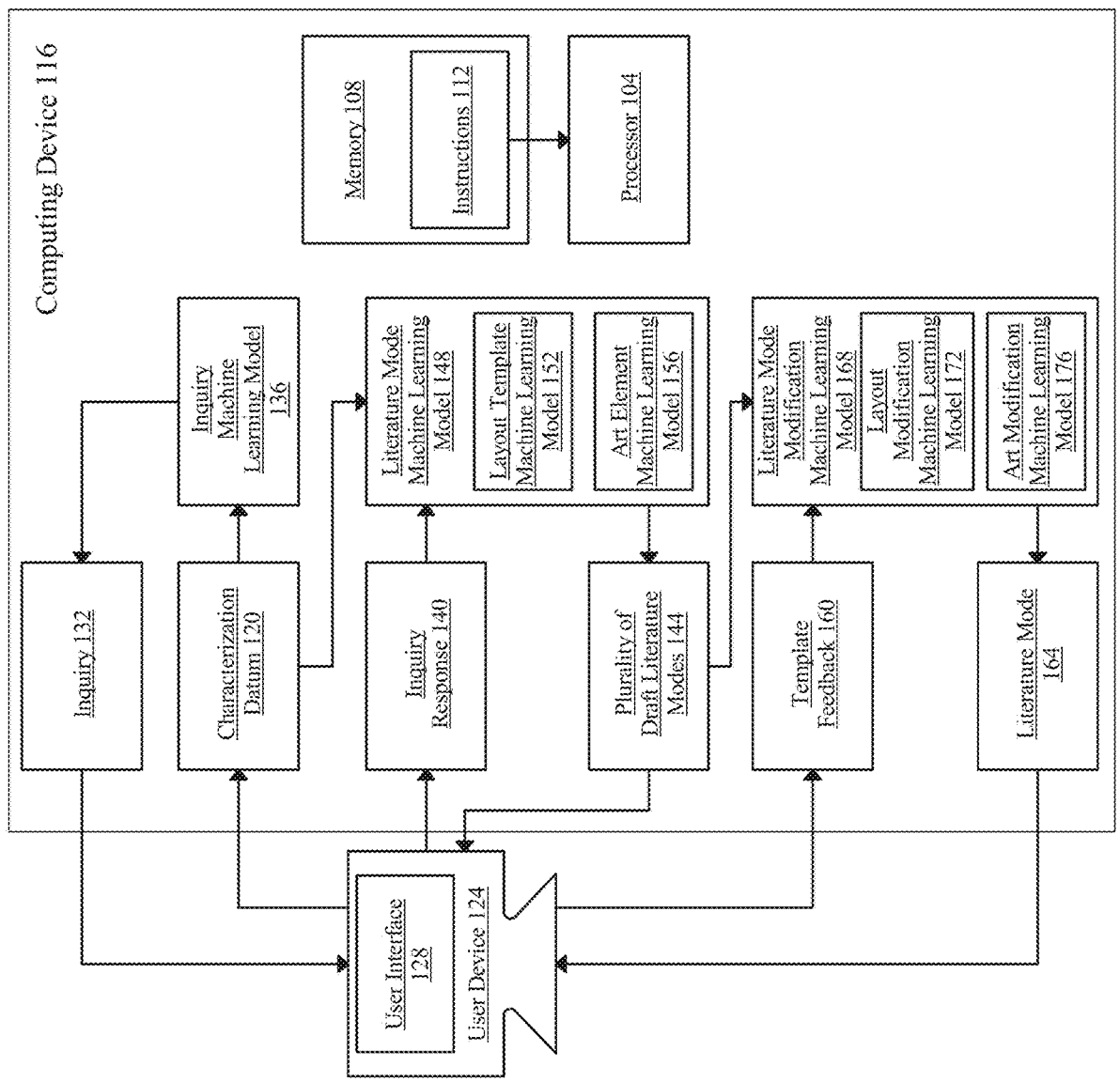
FIG. 1 is a diagram depicting an exemplary apparatus for generative machine-learning guided by modal classification.

Referring now to FIG. 1, an exemplary embodiment of an apparatus 100 for literature design generation is illustrated. Apparatus 100 may include a computing device. Apparatus 100 may include a processor. Processor may include, without limitation, any processor described in this disclosure. Processor may be included in a computing device. Computing device may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device may include a single computing device operating independently, or may include two or more computing device operating in concert, in parallel, sequentially or the like; two or more computing devices may be included together in a single computing device or in two or more computing devices. Computing device may interface or communicate with one or more additional devices as described below in further detail via a network interface device. Network interface device may be utilized for connecting computing device to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device may include but is not limited to, for example, a computing device or cluster of computing devices in a first location and a second computing device or cluster of computing devices in a second location. Computing device may include one or more computing devices dedicated to data storage, security, distribution of traffic for load balancing, and the like. Computing device may distribute one or more computing tasks as described below across a plurality of computing devices of computing device, which may operate in parallel, in series, redundantly, or in any other manner used for distribution of tasks or memory between computing devices. Computing device may be implemented, as a non-limiting example, using a "shared nothing" architecture.

With continued reference to FIG. 1, computing device may be designed and/or configured to perform any method, method step, or sequence of method steps in any embodiment described in this disclosure, in any order and with any degree of repetition. For instance, computing device may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, in some embodiments, apparatus 100 may include at least a processor 104 and a memory 108 communicatively connected to the at least a processor 104, the memory 108 containing instructions 112 configuring the at least a processor 104 to perform one or more processes described herein. Computing devices, such as computing device 116, including memory 108 and at least a processor 104 are described in further detail herein.

Still referring to FIG. 1, as used in this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

Still referring to FIG. 1, in some embodiments, apparatus 100 may receive characterization datum 120. Characterization datum 120 may be received from a user. As used herein, a "characterization datum" is a datum describing a desired layout, art element, or both to be used in a work of literature. Characterization datum 120 may include, in non-limiting examples, a datum in a text format or derived from text, a datum in an audio format or derived from audio, a datum in a video format or derived from video, a multimedia file, a digital book, a digital book cover, a picture of a physical book, an audio recording of a description of a book, a live audio or video feed, an audiobook, and/or another suitable input. As used herein, a "layout" in the context of literature is a stylistic design of a work of literature or potential work of literature. Layouts may include, in non-limiting examples, design aspects such as font, line spacing, page margins, colors of text and/or background, and chapter heading design, but not including the content of text used in the work of literature or potential work of literature. A layout template may include a document including a layout, configured such that content may be added. As used herein, an "art element" in the context of literature is a visual work of art to be included in a work of literature or potential work of literature. Art elements may include, in non-limiting examples, cover art and art to be used in the body of the work of literature or potential work of literature. In some embodiments, characterization datum 120 may be received from a user operating user device 124. User may operate user device 124 using user interface 128. In some embodiments, characterization datum 120 may include a description of features of a literature layout that are desired, a description of features of art elements that are desired, a description of features of literature content that a layout and/or art element are to be used with. As non-limiting examples, characterization datum 120 may include specific fonts, font sizes, page numbering formats, header formats, footer formats, line spacing options, art styles, content to be depicted in art elements, and the like.

Still referring to FIG. 1, characterization datum 120 may be received from a characterization datum source such as user device 124. As used herein, a "characterization datum source" is a process, entity, user, memory, or data structure containing characterization datum. In some embodiments, characterization datum source such as user device 124 may include one or more user devices, databases, computing devices, and/or users. In non-limiting examples, user devices may include smartphones, smartwatches, tablets, and computers. In some embodiments, a characterization datum source such as user device 124 may include a physical or digital form such as a form on a website or in an application. Exemplary forms include forms on a web page asking for initial information as to the overall style and/or theme of a work of literature. In some embodiments, characterization datum 120 may be received from a third party. In a non-limiting example, a third party may operate a database including characterization datum 120, processor 104 may request characterization datum 120 from the database using an application programming interface (API), and processor 104 may receive from the database, or a computing device associated with the database, characterization datum 120. For example, a third party may operate a service in which a user may store a draft of content of a work of literature, and apparatus 100 may use an API from that third party to access the draft content and use the draft content as characterization datum 120.

Still referring to FIG. 1, characterization datum 120 may be input through an interface. An interface may include a graphical user interface (GUI). An interface may include a touch-screen GUI interface. An interface may include a computing device configured to receive an input from a user. In some embodiments. an interface may be configured to prompt a user for an input. In a non-limiting example, an interface may include fields for a user to input layout and/or art preferences.

Still referring to FIG. 1, in some embodiments, apparatus 100 may interact with user using a chatbot. Chatbot may create an initial prompt, asking user for characterization datum 120. Chatbots may use generative machine learning techniques and are described further below. In some embodiments, apparatus 100 may receive characterization datum 120 in a text format (such as with a text response to a chatbot question). In some embodiments, apparatus 100 may receive characterization datum 129 in an audio format (such as with a verbal response to a chatbot question).

Still referring to FIG. 1, in some embodiments, characterization datum 120 may be converted into a different form. Data formats may be converted in a variety of ways, such as without limitation, using a speech to text function or using optical character recognition. In some embodiments, characterization datum 120 may be converted into a different form such that it is in a form appropriate for input into a function. As a non-limiting example, a machine learning model that accepts characterization datum 120 as an input may only accept inputs in a particular format, and characterization datum 120 may be modified in order to be in the correct format for input. For example, characterization datum 120 may be gathered in an audio format and may be transcribed using an automatic speech recognition system, such that it may be input into a language model that only accepts inputs in a text format.

Still referring to FIG. 1, data may also be altered such that it retains the same format but is more likely to produce successful or relevant results. As a non-limiting example, a machine learning model may be used to replace obscure words in a text file with more common words that have similar or identical meanings. In this example, this may be done by training a machine learning model on samples of text using unsupervised learning such that the machine learning model learns associations between words (such as based on how frequently they are used together). In this example, words may be represented as vectors with dimensions indicating their relationship to other words, and whether words are synonyms may be determined based on how similar their vectors are (as in, if vectors representing 2 words point in the same direction, those words may be synonyms). In this example, a first word determined to be similar to or a synonym of a second word, may be replaced by the second word.

Still referring to FIG. 1, in some embodiments, characterization datum 120 may be gathered in an audio format. For example, apparatus 100 may cause user device 124 to display to user a message instructing user to verbally describe a desired layout of a work of literature; user may then verbally describe a desired layout, and this verbal description may be detected using a microphone, recorded, and input into an automatic speech recognition system. Automatic speech recognition system may transcribe speech data, such as a verbal description of a desired layout, into a machine readable format such as text. This may allow speech data such as characterization datum 120 to be input into additional functions as described herein.

Still referring to FIG. 1, in some embodiments, speech data may be processed using automatic speech recognition. In some embodiments, automatic speech recognition may require training (i.e., enrollment). In some cases, training an automatic speech recognition model may require an individual speaker to read text or isolated vocabulary. In some cases, speech training data may include an audio component having an audible verbal content, the contents of which are known a priori by a computing device. Computing device may then train an automatic speech recognition model according to training data which includes audible verbal content correlated to known content. In this way, computing device may analyze a person's specific voice and train an automatic speech recognition model to the person's speech, resulting in increased accuracy. Alternatively, or additionally, in some cases, computing device may include an automatic speech recognition model that is speaker independent. As used in this disclosure, a "speaker independent" automatic speech recognition process is an automatic speech recognition process that does not require training for each individual speaker. Conversely, as used in this disclosure, automatic speech recognition processes that employ individual speaker specific training are "speaker dependent."

Still referring to FIG. 1, in some embodiments, an automatic speech recognition process may perform voice recognition or speaker identification. As used in this disclosure, "voice recognition" is a process of identifying a speaker, from audio content, rather than what the speaker is saying. In some cases, computing device may first recognize a speaker of verbal audio content and then automatically recognize speech of the speaker, for example by way of a speaker dependent automatic speech recognition model or process. In some embodiments, an automatic speech recognition process can be used to authenticate or verify an identity of a speaker. In some cases, a speaker may or may not include subject. For example, subject may speak within speech data, but others may speak as well.

Still referring to FIG. 1, in some embodiments, an automatic speech recognition process may include one or all of acoustic modeling, language modeling, and statistically based speech recognition algorithms. In some cases, an automatic speech recognition process may employ hidden Markov models (HMMs). As discussed in greater detail below, language modeling such as that employed in natural language processing applications like document classification or statistical machine translation, may also be employed by an automatic speech recognition process.

Still referring to FIG. 1, an exemplary algorithm employed in automatic speech recognition may include or even be based upon hidden Markov models. Hidden Markov models (HMIs) may include statistical models that output a sequence of symbols or quantities. HMIs can be used in speech recognition because a speech signal can be viewed as a piecewise stationary signal or a short-time stationary signal. For example, over a short time scale (e.g., 10 milliseconds), speech can be approximated as a stationary process. Speech (i.e., audible verbal content) can be understood as a Markov model for many stochastic purposes.

Still referring to FIG. 1, in some embodiments HMIs can be trained automatically and may be relatively simple and computationally feasible to use. In an exemplary automatic speech recognition process, a hidden Markov model may output a sequence of n-dimensional real-valued vectors (with n being a small integer, such as 10), at a rate of about one vector every 10 milliseconds. Vectors may consist of cepstral coefficients. A cepstral coefficient requires using a spectral domain. Cepstral coefficients may be obtained by taking a Fourier transform of a short time window of speech yielding a spectrum, decorrelating the spectrum using a cosine transform, and taking first (i.e., most significant) coefficients. In some cases, an HMM may have in each state a statistical distribution that is a mixture of diagonal covariance Gaussians, yielding a likelihood for each observed vector. In some cases, each word, or phoneme, may have a different output distribution; an HMM for a sequence of words or phonemes may be made by concatenating an HMMs for separate words and phonemes.

Still referring to FIG. 1, in some embodiments, an automatic speech recognition process may use various combinations of a number of techniques in order to improve results. In some cases, a large-vocabulary automatic speech recognition process may include context dependency for phonemes. For example, in some cases, phonemes with different left and right context may have different realizations as HMM states. In some cases, an automatic speech recognition process may use cepstral normalization to normalize for different speakers and recording conditions. In some cases, an automatic speech recognition process may use vocal tract length normalization (VTLN) for male-female normalization and maximum likelihood linear regression (MLLR) for more general speaker adaptation. In some cases, an automatic speech recognition process may determine so-called delta and delta-delta coefficients to capture speech dynamics and might use heteroscedastic linear discriminant analysis (HLDA). In some cases, an automatic speech recognition process may use splicing and a linear discriminate analysis (LDA)-based projection, which may include heteroscedastic linear discriminant analysis or a global semi-tied covariance transform (also known as maximum likelihood linear transform [MLLT]). In some cases, an automatic speech recognition process may use discriminative training techniques, which may dispense with a purely statistical approach to HMM parameter estimation and instead optimize some classification-related measure of training data; examples may include maximum mutual information (MMI), minimum classification error (MCE), and minimum phone error (MPE).

Still referring to FIG. 1, in some embodiments, an automatic speech recognition process may be said to decode speech (i.e., audible verbal content). Decoding of speech may occur when an automatic speech recognition system is presented with a new utterance and must compute a most likely sentence. In some cases, speech decoding may include a Viterbi algorithm. A Viterbi algorithm may include a dynamic programming algorithm for obtaining a maximum a posteriori probability estimate of a most likely sequence of hidden states (i.e., Viterbi path) that results in a sequence of observed events. Viterbi algorithms may be employed in context of Markov information sources and hidden Markov models. A Viterbi algorithm may be used to find a best path, for example using a dynamically created combination hidden Markov model, having both acoustic and language model information, using a statically created combination hidden Markov model (e.g., finite state transducer [FST] approach).

Still referring to FIG. 1, in some embodiments, speech (i.e., audible verbal content) decoding may include considering a set of good candidates and not only a best candidate, when presented with a new utterance. In some cases, a better scoring function (i.e., re-scoring) may be used to rate each of a set of good candidates, allowing selection of a best candidate according to this refined score. In some cases, a set of candidates can be kept either as a list (i.e., N-best list approach) or as a subset of models (i.e., a lattice). In some cases, re-scoring may be performed by optimizing Bayes risk (or an approximation thereof). In some cases, re-scoring may include optimizing for sentence (including keywords) that minimizes an expectancy of a given loss function with regards to all possible transcriptions. For example, re-scoring may allow selection of a sentence that minimizes an average distance to other possible sentences weighted by their estimated probability. In some cases, an employed loss function may include Levenshtein distance, although different distance calculations may be performed, for instance for specific tasks. In some cases, a set of candidates may be pruned to maintain tractability.

Still referring to FIG. 1, in some embodiments, an automatic speech recognition process may employ dynamic time warping (DTW)-based approaches. Dynamic time warping may include algorithms for measuring similarity between two sequences, which may vary in time or speed. For instance, similarities in walking patterns would be detected, even if in one video the person was walking slowly and if in another he or she were walking more quickly, or even if there were accelerations and deceleration during the course of one observation. DTW has been applied to video, audio, and graphics—indeed, any data that can be turned into a linear representation can be analyzed with DTW. In some cases, DTW may be used by an automatic speech recognition process to cope with different speaking (i.e., audible verbal content) speeds. In some cases, DTW may allow computing device to find an optimal match between two given sequences (e.g., time series) with certain restrictions. That is, in some cases, sequences can be "warped" non-linearly to match each other. In some cases, a DTW-based sequence alignment method may be used in context of hidden Markov models.

Still referring to FIG. 1, in some embodiments, an automatic speech recognition process may include a neural network. Neural network may include any neural network, for example those disclosed with reference to FIGS. 2-4. In some cases, neural networks may be used for automatic speech recognition, including phoneme classification, phoneme classification through multi-objective evolutionary algorithms, isolated word recognition, audiovisual speech recognition, audiovisual speaker recognition and speaker adaptation. In some cases, neural networks employed in automatic speech recognition may make fewer explicit assumptions about feature statistical properties than HMMs and therefore may have several qualities making them attractive recognition models for speech recognition. When used to estimate the probabilities of a speech feature segment, neural networks may allow discriminative training in a natural and efficient manner. In some cases, neural networks may be used to effectively classify audible verbal content over short-time interval, for instance such as individual phonemes and isolated words. In some embodiments, a neural network may be employed by automatic speech recognition processes for pre-processing, feature transformation and/or dimensionality reduction, for example prior to HMM-based recognition. In some embodiments, long short-term memory (LSTM) and related recurrent neural networks (RNNs) and Time Delay Neural Networks (TDNN's) may be used for automatic speech recognition, for example over longer time intervals for continuous speech recognition.

Still referring to FIG. 1, in some embodiments, a language model may be used to process and/or interpret characterization datum 120. As used herein, a "language model" is a program capable of interpreting natural language, generating natural language, or both. In some embodiments, a language model may be configured to interpret the output of an automatic speech recognition function and/or an optical character recognition (OCR) function. A language model may include a neural network. A language model may be trained using a dataset that includes natural language.

Still referring to FIG. 1, generating language model may include generating a vector space, which may be a collection of vectors, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each vector in an n-dimensional vector space may be represented by an n-tuple of numerical values. Each unique extracted word and/or language element as described above may be represented by a vector of the vector space. In an embodiment, each unique extracted and/or other language element may be represented by a dimension of vector space; as a non-limiting example, each element of a vector may include a number representing an enumeration of co-occurrences of the word and/or language element represented by the vector with another word and/or language element. Vectors may be normalized, scaled according to relative frequencies of appearance and/or file sizes. In an embodiment associating language elements to one another as described above may include computing a degree of vector similarity between a vector representing each language element and a vector representing another language element; vector similarity may be measured according to any norm for proximity and/or similarity of two vectors, including without limitation cosine similarity, which measures the similarity of two vectors by evaluating the cosine of the angle between the vectors, which can be computed using a dot product of the two vectors divided by the lengths of the two vectors. Degree of similarity may include any other geometric measure of distance between vectors.

Still referring to FIG. 1, processor 104 may determine one or more language elements in characterization datum 120 by identifying and/or detecting associations between one or more language elements (including phonemes or phonological elements, morphemes or morphological elements, syntax or syntactic elements, semantics or semantic elements, and pragmatic elements) extracted from at least user data and/or response, including without limitation mathematical associations, between such words. Associations between language elements and relationships of such categories to other such term may include, without limitation, mathematical associations, including without limitation statistical correlations between any language element and any other language element and/or Language elements. Processor 104 may compare an input such as a sentence from characterization datum 120 with a list of keywords or a dictionary to identify language elements. For example, processor 104 may identify whitespace and punctuation in a sentence and extract elements comprising a string of letters, numbers or characters occurring adjacent to the whitespace and punctuation. Processor 104 may then compare each of these with a list of keywords or a dictionary. Based on the determined keywords or meanings associated with each of the strings, processor 104 may determine an association between one or more of the extracted strings and a feature of a desired layout and/or art element, such as an association between a string containing the text "12pt" and a 12 point font size. Associations may take the form of statistical correlations and/or mathematical associations, which may include probabilistic formulas or relationships indicating, for instance, a likelihood that a given extracted word indicates a given category of semantic meaning. As a further example, statistical correlations and/or mathematical associations may include probabilistic formulas or relationships indicating a positive and/or negative association between at least an extracted word and/or a given semantic meaning; positive or negative indication may include an indication that a given document is or is not indicating a category semantic meaning. Whether a phrase, sentence, word, or other textual element in a document or corpus of documents constitutes a positive or negative indicator may be determined, in an embodiment, by mathematical associations between detected words, comparisons to phrases and/or words indicating positive and/or negative indicators that are stored in memory.

Still referring to FIG. 1, processor 104 may be configured to determine one or more language elements in characterization datum 120 using machine learning. For example, processor 104 may generate the language processing model by any suitable method, including without limitation a natural language processing classification algorithm; language processing model may include a natural language process classification model that enumerates and/or derives statistical relationships between input terms and output terms. An algorithm to generate language processing model may include a stochastic gradient descent algorithm, which may include a method that iteratively optimizes an objective function, such as an objective function representing a statistical estimation of relationships between terms, including relationships between input language elements and output patterns or conversational styles in the form of a sum of relationships to be estimated. In an alternative or additional approach, sequential tokens may be modeled as chains, serving as the observations in a Hidden Markov Model (HMM). HMMs as used herein are statistical models with inference algorithms that that may be applied to the models. In such models, a hidden state to be estimated may include an association between an extracted word, phrase, and/or other semantic unit. There may be a finite number of categories to which an extracted word may pertain; an HMM inference algorithm, such as the forward-backward algorithm or the Viterbi algorithm, may be used to estimate the most likely discrete state given a word or sequence of words. Language processing module may combine two or more approaches. For instance, and without limitation, machine-learning program may use a combination of Naïve-Bayes (NB), Stochastic Gradient Descent (SGD), and parameter grid-searching classification techniques; the result may include a classification algorithm that returns ranked associations.

Still referring to FIG. 1, processor 104 may be configured to determine one or more language elements in characterization datum 120 using machine learning by first creating or receiving language classification training data. Training data may include data containing correlations that a machine-learning process may use to exemplary relationships between two or more categories of data elements. For instance, and without limitation, training data may include a plurality of data entries, each entry representing a set of data elements that were recorded, received, and/or generated together; data elements may be correlated by shared existence in a given data entry, by proximity in a given data entry, or the like. Multiple data entries in training data may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data according to various correlations; correlations may indicate causative and/or predictive links between categories of data elements, which may be modeled as relationships such as mathematical relationships by machine-learning processes as described in further detail below. Training data may be formatted and/or organized by categories of data elements, for instance by associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to descriptors of categories by tags, tokens, or other data elements; for instance, and without limitation, training data may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Still referring to FIG. 1, training data may include one or more elements that are not categorized; that is, training data may not be formatted or contain descriptors for some elements of data. Machine-learning algorithms and/or other processes may sort training data according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data to be made applicable for two or more distinct machine-learning algorithms as described in further detail below.

Still referring to FIG. 1, language classification training data may be a training data set containing associations between language element inputs and associated language element outputs. Language element inputs and outputs may be categorized by communication form such as written language elements, spoken language elements, typed language elements, or language elements communicated in any suitable manner. Language elements may be categorized by component type, such as phonemes or phonological elements, morphemes or morphological elements, syntax or syntactic elements, semantics or semantic elements, and pragmatic elements. Associations may be made between similar communication types of language elements (e.g. associating one written language element with another written language element) or different language elements (e.g. associating a spoken language element with a written representation of the same language element). Associations may be identified between similar communication types of two different language elements, for example written input consisting of the syntactic element "that" may be associated with written phonemes /th/, /ă/, and /t/. Associations may be identified between different communication forms of different language elements. For example, the spoken form of the syntactic element "that" and the associated written phonemes above. Language classification training data may be created using a classifier such as a language classifier. An exemplary classifier may be created, instantiated, and/or run using processor 104, or another computing device. Language classification training data may create associations between any type of language element in any format and other type of language element in any format. Additionally, or alternatively, language classification training data may associate language element input data to a feature related to a desired layout and/or art element. For example, language classification training data may associate occurrences of the syntactic elements "1," "inch" and "margins," in a single sentence with the feature of desiring 1 inch page margins.

Still referring to FIG. 1, processor 104 may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A) \div P(B)$, where $P(AB)$ is the probability of hypothesis A given data B also known as posterior probability; P(B/A) is the probability of data B given that the hypothesis A was true; P(A) is the probability of hypothesis A being true regardless of data also known as prior probability of A; and P(B) is the probability of the data regardless of the hypothesis. A naïve Bayes algorithm may be generated by first transforming training data into a frequency table. Processor 104 may then calculate a likelihood table by calculating probabilities of different data entries and classification labels. Processor 104 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

Still referring to FIG. 1, processor 104 may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

Still referring to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute/as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

Still referring to FIG. 1, in some embodiments, apparatus 100 may generate inquiry 132 as a function of characterization datum 120. As used herein, an "inquiry" is a prompt designed to produce a response that includes data describing a desired layout, art element, or both to be used in a work of literature. In some embodiments, inquiry 132 may be in question format. In some embodiments, inquiry 132 may be in a non-question format (such as "please describe the theme of the book").

Still referring to FIG. 1, in some embodiments, apparatus 100 may generate inquiry 132 using an inquiry machine learning model 136. Inquiry machine learning model 136 may use generative machine learning techniques as described below. Inquiry machine learning model 136 may be trained on a training dataset including model text characterization data, associated with exemplary inquiries. Such training data may be gathered, for example, by gathering data on questions human professionals designing literature layouts and/or art ask of authors. Inquiry machine learning model 136 may accept as an input characterization datum 120 and may output inquiry 132.

Still referring to FIG. 1, in some embodiments, inquiry machine learning model 136 may be trained to optimize for a certainty score produced by a literature mode machine learning model, as described further below.

Still referring to FIG. 1, in some embodiments, inquiry machine learning model 136 may be trained using a reinforcement learning algorithm. For example, inquiry machine learning model 136 may be given inputs such as characterization datum 120, and inquiry machine learning model 136 may be adjusted based on a cost function, where the cost function is based on the model's output. Such a cost function may take into account, for example, user feedback (such as liking or disliking inquiries), certainty score, change in certainty score, and/or manual assessment of inquiries by humans.

Still referring to FIG. 1, in some embodiments, a machine learning model described herein, such as inquiry machine learning model 136, literature mode machine learning model 148, layout template machine learning model 152, art element machine learning model 156, literature mode modification machine learning model 168, layout modification machine learning model 168, and/or art modification machine learning model 176, may utilize generative machine learning techniques. Generative AI may use machine learning algorithms to create, establish, or otherwise generate data such as, without limitation, inquiry 132 and/or the like in any data structure as described herein (e.g., text, image, video, audio, among others) that is similar to one or more provided training examples. In an embodiment, machine learning module described herein may generate one or more generative machine learning models that are trained on one or more set of training data such as exemplary text characterization data. One or more generative machine learning models may be configured to generate new examples that are similar to the training data of the one or more generative machine learning models but are not exact replicas; for instance, and without limitation, data quality or attributes of the generated examples may bear a resemblance to the training data provided to one or more generative machine learning models, wherein the resemblance may pertain to underlying patterns, features, or structures found within the provided training data.

Still referring to FIG. 1, in some cases, generative machine learning models may include one or more generative models. As described herein, "generative models" refers to statistical models of the joint probability distribution P (X, Y) on a given observable variable x, representing features or data that can be directly measured or observed (e.g., characterization datum 120) and target variable y, representing the outcomes or labels that one or more generative models aims to predict or generate (e.g., inquiry 132). In some cases, generative models may rely on Bayes theorem to find joint probability; for instance, and without limitation, Naïve Bayes classifiers may be employed by computing device 116 to categorize input data such as, without limitation, characterization datum 120 into different classes such as, without limitation, classes of different literature formats, such as newspaper, book, scientific journal and magazine formats.

Still referring to FIG. 1, in a non-limiting example, one or more generative machine learning models may include one or more Naïve Bayes classifiers generated, by computing device, using a Naïve bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A)\div P(B)$, where $P(AB)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing Device may then calculate a likelihood table by calculating probabilities of different data entries and classification labels. Computing device may utilize a naïve Bayes equation to calculate a posterior probability for each class. A class containing the highest posterior probability is the outcome of prediction.

Still referring to FIG. 1, although Naïve Bayes classifier may be primarily known as a probabilistic classification algorithm; however, it may also be considered a generative model described herein due to its capability of modeling the joint probability distribution P (X, Y) over observable variables X and target variable Y. In an embodiment, Naïve Bayes classifier may be configured to make an assumption that the features X are conditionally independent given class label Y, allowing generative model to estimate the joint distribution as $P(X, Y)=P(Y)\Pi_i P(X_i|Y)$, wherein $P(Y)$ may be the prior probability of the class, and $P(X_i|Y)$ is the conditional probability of each feature given the class. One or more generative machine learning models containing Naïve Bayes classifiers may be trained on labeled training data, estimating conditional probabilities $P(X_i|Y)$ and prior probabilities $P(Y)$ for each class; for instance, and without limitation, using techniques such as Maximum Likelihood Estimation (MLE). One or more generative machine learning models containing Naïve Bayes classifiers may select a class label y according to prior distribution $P(Y)$, and for each feature $X_i$, sample at least a value according to conditional distribution $P(X_i|y)$. Sampled feature values may then be combined to form one or more new data instance with selected class label y. In a non-limiting example, one or more generative machine learning models may include one or more Naïve Bayes classifiers to generate new examples of inquiry 132 based on classification of input data (e.g., newspaper, magazine, scientific journal article, or book), wherein the models may be trained using training data containing a plurality of features e.g., features of characterization datum 120, and/or the like as input correlated to a plurality of labeled classes e.g., newspaper, magazine, scientific journal article, or book as output.

Still referring to FIG. 1, in some cases, one or more generative machine learning models may include generative adversarial network (GAN). As used in this disclosure, a "generative adversarial network" is a type of artificial neural network with at least two sub models (e.g., neural networks), a generator, and a discriminator, that compete against each other in a process that ultimately results in the generator learning to generate new data samples, wherein the "generator" is a component of the GAN that learns to create hypothetical data by incorporating feedbacks from the "discriminator" configured to distinguish real data from the hypothetical data. In some cases, generator may learn to make discriminator classify its output as real. In an embodiment, discriminator may include a supervised machine learning model while generator may include an unsupervised machine learning model as described in further detail with reference to FIG. 2.

Still referring to FIG. 1, in an embodiment, discriminator may include one or more discriminative models, i.e., models of conditional probability $P(Y|X=x)$ of target variable Y, given observed variable X. In an embodiment, discriminative models may learn boundaries between classes or labels in given training data. In a non-limiting example, discriminator may include one or more classifiers as described in further detail below with reference to FIG. 2 to distinguish between different categories, or states e.g., TRUE vs. FALSE within the context of generated data such as, without limitations, inquiry 132, and/or the like. In some cases, computing device may implement one or more classification algorithms such as, without limitation, Support Vector Machines (SVM), Logistic Regression, Decision Trees, and/or the like to define decision boundaries.

Still referring to FIG. 1, in a non-limiting example, generator of GAN may be responsible for creating synthetic data that resembles real inquiries. In some cases, GAN may be configured to receive characterization datum 120, as input and generates corresponding inquiries 132 containing information describing or evaluating the performance of one or more elements of input data. On the other hand, discriminator of GAN may evaluate the authenticity of the generated content by comparing it to real inquiries, for example, discriminator may distinguish between genuine and generated content and providing feedback to generator to improve the model performance.

Still referring to FIG. 1, in some embodiments, one or more generative models may also include a variational autoencoder (VAE). As used in this disclosure, a "variational autoencoder" is an autoencoder (i.e., an artificial neural network architecture) whose encoding distribution is regularized during the model training process in order to ensure that its latent space includes desired properties allowing new data sample generation. In an embodiment, VAE may include a prior and noise distribution respectively, trained using expectation-maximization meta-algorithms such as, without limitation, probabilistic PCA, sparse coding, among others. In a non-limiting example, VEA may use a neural network as an amortized approach to jointly optimize across input data and output a plurality of parameters for corresponding variational distribution as it maps from a known input space to a low-dimensional latent space. Additionally, or alternatively, VAE may include a second neural network, for example, and without limitation, a decoder, wherein the "decoder" is configured to map from the latent space to the input space.

Still referring to FIG. 1, in a non-limiting example, VAE may be used by computing device to model complex relationships between elements of input data such as text characterization data. In some cases, VAE may encode input data into a latent space, capturing inquiries. Such encoding process may include learning one or more probabilistic mappings from observed text characterization data to a lower-dimensional latent representation. Latent representation may then be decoded back into the original data space, therefore reconstructing the text characterization data. In some cases, such decoding process may allow VAE to generate new examples or variations that are consistent with the learned distributions.

Still referring to FIG. 1, one or more generative machine learning models may utilize one or more predefined templates representing, for example, and without limitation, correct inquiry 132. In a non-limiting example, one or more templates (i.e., predefined models or representations of correct and ideal inquiries) may serve as benchmarks for comparing and evaluating plurality of characterization datum 120.

Still referring to FIG. 1, computing device may configure generative machine learning models to analyze input data such as, without limitation, characterization datum 120 to one or more predefined templates representing correct inquiries 132 described above, thereby allowing computing device to identify discrepancies or deviations from a desired or optimal inquiry. In some cases, computing device may be configured to pinpoint specific errors in input data such as spelling errors or any other aspects of the characterization datum 120. In some cases, errors may be classified into different categories or severity levels. In a non-limiting example, some errors may be considered minor, and generative machine learning model such as, without limitation, GAN may be configured to generate inquiry 132 contain only slight adjustments while others may be more significant and demand more substantial corrections. In some embodiments, computing device may be configured to flag or highlight errors such as spelling errors, directly on the characterization datum 120 using one or more generative machine learning models described herein. In some cases, one or more generative machine learning models may be configured to generate and output indicators such as, without limitation, visual indicator, audio indicator, and/or any other indicators as described above. Such indicators may be used to signal the detected error described herein.

Still referring to FIG. 1, other exemplary embodiments of generative machine learning models may include, without limitation, long short-term memory networks (LSTMs), (generative pre-trained) transformer (GPT) models, mixture density networks (MDN), and/or the like.

Still referring to FIG. 1, in a further non-limiting embodiment, machine learning module may be further configured to generate a multi-model neural network that combines various neural network architectures described herein. In a non-limiting example, multi-model neural network may combine LSTM for time-series analysis with GPT models for natural language processing. Such fusion may be applied by apparatus 100 to generate inquiry 132. In some cases, multi-model neural network may also include a hierarchical multi-model neural network, wherein the hierarchical multi-model neural network may involve a plurality of layers of integration; for instance, and without limitation, different models may be combined at various stages of the network. Convolutional neural network (CNN) may be used for image feature extraction, followed by LSTMs for sequential pattern recognition, and a MDN at the end for probabilistic modeling. Other exemplary embodiments of multi-model neural network may include, without limitation, ensemble-based multi-model neural network, cross-modal fusion, adaptive multi-model network, among others.

Still referring to FIG. 1, in some embodiments, apparatus 100 may communicate inquiry 132 to a user. In some embodiments, apparatus 100 may transmit a signal including inquiry 132 to user device 124, and the signal may configure user device 124 to communicate inquiry 132 to user. User device 124 may communicate inquiry 132 to user using, for example, a visual or audio format. Apparatus 100 may communicate a visual element and/or visual element data structure including inquiry 132 to user device 124. This may configure user device 124 to display a visual element. As used herein, a device "displays" a datum if the device outputs the datum in a format suitable for communication to a user. For example, a device may display a datum by outputting text or an image on a screen or outputting a sound using a speaker.

Still referring to FIG. 1, in some embodiments, apparatus 100 may receive inquiry response 140. As used herein, an "inquiry response" is a datum describing a desired layout, art element, or both that is to be used in a work of literature and that is responsive to an inquiry. User may communicate inquiry response 140, and apparatus 100 may receive inquiry response 140, in the same ways described above with respect to receipt of characterization datum 120. For example, user may interact with apparatus 100 through a chatbot, and chatbot may verbally ask user to specify the font to be used in a work of literature. In this example, user may respond verbally, such as by specifying a font or describing features of a font. In this example, apparatus 100 may detect this inquiry response 140 using a microphone, use an automatic speech recognition system to transcribe inquiry response 140, and interpret inquiry response 140 using a language model. In some embodiments, inquiry response 140 is in an audio format. In some embodiments, inquiry response 140 is in a text format. In some embodiments, inquiry response 140 is received from user device 124.

Still referring to FIG. 1, in some embodiments, apparatus 100 may generate one or more draft literature modes. For example, apparatus 100 may generate plurality of draft literature modes 144. As used herein, a "draft literature mode" is a layout, art element, element of promotional material, or combination of these that is generated based on a characterization datum and an inquiry response. In some embodiments, a draft literature mode may include a draft layout template. As used herein, a "draft layout template" is a layout that is generated based on a characterization datum and an inquiry response. In some embodiments, a draft literature mode may include a draft art element. As used herein, a "draft art element" is an art element that is generated based on a characterization datum and an inquiry response. In some embodiments, apparatus 100 may generate plurality of draft literature modes 144 using literature mode machine learning model 148. In some embodiments, literature mode machine learning model 148 may include layout template machine learning model 152. In some embodiments, literature mode machine learning model 148 may include art element machine learning model 156. Literature mode machine learning model 148, layout template machine learning model 152, and/or art element machine learning model 156 may use generative machine learning techniques as described above.

Still referring to FIG. 1, in some embodiments, layout template machine learning model 152 may be trained on a training dataset including exemplary inquiry responses and exemplary text characterization data, associated with exemplary draft layout templates. Training data may be gathered by, for example, gathering historical information given to layout artists by authors, and the layouts produced by layout artists based on that information. In another example, training data may be gathered by collecting literature layouts, and determining the attributes of each collected literature layout. This may be done, in non-limiting examples, manually, or using a classifier. Once layout template machine learning model 152 has been trained, it may be used to produce draft layout templates. Characterization datum 120 and/or inquiry response 140 may be input into layout template machine learning model 152, and one or more draft layout templates may be received from layout template machine learning model 152 as an output.

Still referring to FIG. 1, in some embodiments, a plurality of draft layout templates may be generated using layout template machine learning model 152. This may be done by, in a non-limiting example, configuring and training layout template machine learning model 152 to produce multiple draft layout templates as outputs. In some embodiments, this may involve including multiple model draft layout templates with each instance of training data. In another example, this may be done by running layout template machine learning model 152 multiple times. In some embodiments, different inputs may be used across multiple runs in order to generate varying results. For example, subsets of characterization datum 120 and/or inquiry response 140 may be input into layout template machine learning model 152. As another example, a random variable may be used to generate variation. As another example, a set of predetermined variables may be used. Such predetermined variables may be selected by humans such as professional layout artists in order to produce appealing layouts. For example, layout template machine learning model 152 may be trained to produce layouts in varying styles based on an input in addition to the ones described above. Training data in this example may be designed to conform in part to predetermined styles but be modified based on exemplary text characterization data and exemplary inquiry responses. This may also be achieved using multiple layout template machine learning models 152, each trained on a different set of training data.

Still referring to FIG. 1, in some embodiments, layout template machine learning model 152 may be trained using reinforcement learning. In some embodiments, this may be done after initial training using supervised learning. For example, layout template machine learning model 152 may produce draft layout templates as outputs and may receive feedback in the form of a cost function based on user feedback such as whether a user accepts a draft layout template.

Still referring to FIG. 1, in some embodiments, layout template machine learning model 152 may include a language model used to interpret characterization datum 120 and/or inquiry response 140 and extract desired features from this data as described above. Processor 104 may then determine a draft layout template as a function of these features.

Still referring to FIG. 1, in some embodiments, art element machine learning model 156 may be trained on a training dataset including exemplary inquiry responses and exemplary text characterization data, associated with exemplary draft art elements. Training data may be gathered by, for example, gathering historical information given to artists by authors, and the art elements produced by artists based on that information. In another example, training data may be gathered by collecting artwork, such as artwork used in literature, and determining the attributes of each collected piece of artwork. This may be done, in non-limiting examples, manually, or using a classifier. Once art element machine learning model 156 has been trained, it may be used to produce draft art elements. Characterization datum 120 and/or inquiry response 140 may be input into art element machine learning model 156, and one or more draft art elements may be received from art element machine learning model 156 as an output.

Still referring to FIG. 1, in some embodiments, a plurality of draft art elements may be generated using art element machine learning model 156. This may be done by, in a non-limiting example, configuring and training art element machine learning model 156 to produce multiple draft art elements as outputs. In some embodiments, this may involve including multiple exemplary draft art elements with each instance of training data. In another example, this may be done by running art element machine learning model 156 multiple times. In some embodiments, different inputs may be used across multiple runs in order to generate varying results. For example, subsets of characterization datum 120 and/or inquiry response 140 may be input into art element machine learning model 156. As another example, a random variable may be used to generate variation. As another example, a set of predetermined variables may be used. Such predetermined variables may be selected by humans such as professional artists in order to produce appealing art elements. For example, art element machine learning model 156 may be trained to produce art elements in varying styles based on an input in addition to the ones described above. Training data in this example may be designed to conform in part to predetermined styles but be modified based on exemplary text characterization data and exemplary inquiry responses. This may also be achieved using multiple art element machine learning models 156, each trained on a different set of training data.

Still referring to FIG. 1, in some embodiments, art element machine learning model 156 may be trained using reinforcement learning. In some embodiments, this may be done after initial training using supervised learning. For example, art element machine learning model 156 may produce draft art elements as outputs and may receive feedback in the form of a cost function based on user feedback such as whether a user accepts a draft art element.

Still referring to FIG. 1, in some embodiments, apparatus 100 may produce a certainty score. In some embodiments, literature mode machine learning model 148 may output a certainty score in addition to its other outputs. As used herein, a "certainty score" is a degree of confidence in an output of a machine learning model. Certainty scores may be used to predict how likely an output is to be acceptable to a user. For example, in some classifiers, numerical values are calculated, and a cutoff value is used to determine which category the input fits into. In this example, the numerical value may be used to determine a certainty score based on how closely it fits into a class and/or how close to a decision boundary it is. In another example, in clustering algorithms, certainty scores may be calculated based on how closely an input fits into a cluster. In another example, a generative machine learning model may be trained on a dataset including exemplary certainty scores. Such a dataset may be generated, for example, using methods described elsewhere herein, with the added feature of certainty scores being based on manually input ratings of how responsive an output is to inputs and/or how high quality the output is.

Still referring to FIG. 1, in some embodiments, inquiry machine learning model 136 may be trained to optimize certainty scores. For example, inquiry machine learning model 136 may be trained using reinforcement learning to produce inquiries 132 that produce inquiry responses 140 that produce high certainty scores. In this example, a reinforcement learning cost function may be based on a certainty score. In another example, inquiry machine learning model 136 may be trained using supervised learning on a training dataset that only produced high certainty scores. In some embodiments, apparatus 100 may produce inquiries 132 and accept inquiry responses 140 until certainty score passes a threshold. In some embodiments, apparatus 100 may stop producing inquiries 132 and accepting inquiry responses 140 after a certain number of inquiries 132 and/or inquiry responses 140.

Still referring to FIG. 1, in some embodiments, layout template machine learning model 152 and/or art element machine learning model 156 may receive as inputs only a subset of characterization datum 120 and/or inquiry response 140. For example, inquiry response 140 may include a first statement relevant to a layout, and a second statement relevant to an art element, and each machine learning model may only receive the relevant information as inputs. This separation may be done using a classifier. Such a classifier may be trained on a training dataset including exemplary text characterization data and/or exemplary inquiry responses, associated with whether they are relevant to layout, art elements, both, or neither.

Still referring to FIG. 1, in some embodiments, apparatus 100 may determine inquiry 132, plurality of draft literature modes 144, and/or literature mode 164 as a function of a dataset including a plurality of works of literature. Such a dataset may be organized, for example, by genre, publication date, and the like. This may allow, for example, trends and applicable subsets of data to a specific user preference to be identified. Such a dataset may include design elements such as art elements and layouts used in those works of literature. In some embodiments, such a dataset may be used to train a machine learning model such as layout template machine learning model 152 and/or art element machine learning model 156. In some embodiments, apparatus 100 may generate a plurality of draft literature modes 144 based on subsets of such a dataset. For example, apparatus 100 may generate a first literature mode that has a modern style, a second literature mode that has a classic style, and a third literature mode that is based on recent trends. In some embodiments, apparatus 100 may generate such literature modes using one or more machine learning models trained on such a dataset and/or subsets of such a dataset. For example, data set elements may be tagged as having a particular style, and machine learning models may be trained on such a dataset such that they output layouts and/or art elements having a particular style or following recent trends. In some embodiments, apparatus 100 may determine inquiry 132, plurality of draft literature modes 144, and/or literature mode 164 as a function of trends in such a dataset. Trends may be identified, in non-limiting examples, based on usage rates of design features over time. For example, a recent spike in use of a particular art style in covers of a particular genre of book may prompt apparatus 100 to generate a draft literature mode 144 that has a cover of that art style. In some embodiments, processor 104 may identify one or more trends and may adjust inputs into layout template machine learning model 152 and/or art element machine learning model 156 in order to produce layouts and/or art elements according to the one or more trends.

Still referring to FIG. 1, in some embodiments, apparatus 100 may communicate one or more draft literature modes to user. In some embodiments, apparatus 100 may communicate plurality of draft literature modes 144 to user. This may be done as described above with respect to communicating inquiry 132 to user. For example, apparatus 100 may transmit a signal including plurality of draft literature modes 144 to user device 124, and the signal may configure user device 124 to communicate plurality of draft literature modes 144 to user. User device 124 may communicate plurality of draft literature modes 144 to user using, for example, a visual or audio format. For example, user device 124 may communicate one or more draft layout templates to user by describing their features using computer generated speech. In another example, user device 124 may communicate one or more draft layout templates to user by displaying one or more visual elements depicting the one or more draft layout templates. In another example, user device 124 may communicate one or more draft art elements to user by displaying one or more visual elements depicting the one or more draft art elements. Apparatus 100 may communicate a visual element and/or visual element data structure including plurality of draft literature modes 144 to user device 124. This may configure user device 124 to display a visual element. In some embodiments, apparatus 100 may communicate plurality of draft literature modes 144 to user in a format suitable for selecting an individual one, commenting on an individual one, rating an individual one, saving an individual one, and the like.

Still referring to FIG. 1, in some embodiments, apparatus 100 may receive template feedback 160 from a user. As used herein, "template feedback" is data describing a user response to one or more draft literature modes. Template feedback 160 may include, in non-limiting examples, an acceptance of a draft literature mode, a rejection of a draft literature mode, a modification to a draft literature mode, a suggested modification to a draft literature mode, a selection of a draft literature mode, and the like. User may communicate inquiry response 140, and apparatus 100 may receive template feedback 160, in the same ways described above with respect to receipt of characterization datum 120. For example, user may interact with apparatus 100 through a chatbot, and chatbot may display to user plurality of draft literature modes 144. In this example, user may respond verbally, such as by selecting a draft literature mode and suggesting a modification to it. In this example, apparatus 100 may detect this template feedback 160 using a microphone, use an automatic speech recognition system to transcribe template feedback 160, and interpret template feedback 160 using a language model. In an example, template feedback 160 may include a user statement that an art element should be "like art element 1 but darker." In another example, template feedback 160 may include a user statement that a layout should be "like layout 1 but with wider margins." In some embodiments, template feedback 160 is in an audio format. In some embodiments, template feedback 160 is in a text format. In some embodiments, template feedback 160 is in the form of interactions with one or more user interface elements associated with a draft literature mode. In some embodiments, template feedback 160 is received from user device 124.

Still referring to FIG. 1, in some embodiments, apparatus 100 may produce one or more additional inquiries 132 and/or receive one or more additional inquiry responses 140 as a function of template feedback 160. For example, if user rejects all of plurality of draft literature modes 144, then inquiry 132 may be produced in order to gather additional data to create output to better suit the user's needs. In another example, if template feedback 160 includes a dramatic change, then inquiry 132 may be produced. In another example, if template feedback 160 includes an unclear statement, then inquiry 132 may be produced in order to clarify the statement. In some embodiments, a language model may be used to interpret template feedback 160 to determine a meaning of template feedback 160 and whether an additional inquiry 132 is necessary.

Still referring to FIG. 1, in some embodiments, apparatus 100 may determine and/or output literature mode 164. As used herein, a "literature mode" is an art element, layout, element of promotional material, or combination of these that is generated as a function of a draft literature mode. In some embodiments, literature mode 164 may include a layout template and/or an art element. In some embodiments, literature mode 164 may include visual and/or audio elements to be associated with a work of literature but that are not directly part of a work of literature. In a non-limiting example, literature mode 164 may include artwork to be associated with a podcast related to a work of literature. In some embodiments, literature mode 164 may be determined as a function of plurality of draft literature modes 144. In some embodiments, literature mode 164 may be determined as a function of template feedback 160. In some embodiments, literature mode 164 may be determined as a function of characterization datum 120 and/or inquiry response 140. In some embodiments, literature mode 164 may be determined as a function of inquiry response 140 produced as a function of inquiry 132 produced as a function of template feedback 160. Still referring to FIG. 1, in some embodiments, determining literature mode 164 includes selecting from plurality of draft literature modes 144, which may be done as a function of template feedback 160. In some embodiments, literature mode 164 may be determined by modifying a draft literature mode from plurality of draft literature modes 144, which may be done as a function of template feedback 160.

Still referring to FIG. 1, in some embodiments, literature mode 164 may be determined using literature mode modification machine learning model 168. Literature mode modification machine learning model 168 may include layout modification machine learning model 172. Literature mode modification machine learning model 168 may include art modification machine learning model 176.

Still referring to FIG. 1, in some embodiments, layout modification machine learning model 172 may be trained on a training dataset including exemplary draft layout templates and exemplary template feedback, associated with exemplary layout templates. Training data may be gathered by, for example, gathering historical feedback given to layout artists by authors based on drafts produced by layout artists, and the follow up layouts produced by layout artists based on that feedback. In another example, training data may be gathered by collecting different versions of literature layouts for the same work of literature, and identifying the changes made between each version. This may be done, in non-limiting examples, manually, or using a classifier. Once layout modification machine learning model 172 has been trained, it may be used to produce draft layout templates. Plurality of draft literature modes 144 and/or template feedback 160 may be input into layout modification machine learning model 172, and one or more layout templates may be received from layout modification machine learning model 172 as an output.

Still referring to FIG. 1, in some embodiments, layout modification machine learning model 172 may be trained using reinforcement learning. In some embodiments, this may be done after initial training using supervised learning. For example, layout modification machine learning model 172 may produce draft layout templates as outputs and may receive feedback in the form of a cost function based on user feedback such as user ratings of layout templates.

Still referring to FIG. 1, in some embodiments, layout modification machine learning model 172 may include a language model used to interpret template feedback 160 and extract desired features from this data as described above. Processor 104 may then determine a layout template by applying these features to an identified draft layout template. For example, if a language model interprets template feedback 160 as identifying a particular draft layout template, and interprets template feedback 160 as suggesting wider margins, then processor 104 may determine literature mode 164 including layout template including wider margins. Several such processor 104 functions may be designed in order to conform to popular user requests. For example, such functions may be used to change font, change font size, change page dimensions, change between landscape and portrait orientation, change line spacing, change paragraph indentation, change margin size, change font and/or background color, change header style, change footer style, change page numbering format, and the like.

Still referring to FIG. 1, in some embodiments, art modification machine learning model 176 may be trained on a training dataset including exemplary draft art elements and exemplary template feedback, associated with exemplary art elements. Training data may be gathered by, for example, gathering historical feedback given to artists by authors based on artwork drafts, and the art elements produced by artists based on that feedback. In another example, training data may be gathered by collecting multiple drafts of artwork, such as artwork used in literature, and determining the changes made to each collected piece of artwork. This may be done, in non-limiting examples, manually, or using a classifier. Once art modification machine learning model 176 has been trained, it may be used to produce draft art elements. Plurality of draft literature modes 144 and/or template feedback 160 may be input into art modification machine learning model 176, and one or more art elements may be received from art modification machine learning model 176 as an output.

Still referring to FIG. 1, in some embodiments, art modification machine learning model 176 may be trained using reinforcement learning. In some embodiments, this may be done after initial training using supervised learning. For example, art modification machine learning model 176 may produce art elements as outputs and may receive feedback in the form of a cost function based on user feedback such as user ratings of art elements.

Still referring to FIG. 1, in some embodiments, layout modification machine learning model 172 and/or art modification machine learning model 176 may receive as inputs only a subset of plurality of draft literature modes 144 and/or template feedback 160. For example, template feedback 160 may include a selection of a draft layout template from plurality of draft literature modes 144, and a suggested modification to that draft layout template. In this example, processor 104 may only input into layout modification machine learning model 172 the identified draft layout template and the relevant template feedback 160. As another example, template feedback 160 may include a first statement relevant to a layout, and a second statement relevant to an art element, and each machine learning model may only receive the relevant information as inputs. This separation may be done using a classifier. Such a classifier may be trained on a training dataset including exemplary template feedback and/or exemplary draft literature modes, associated with whether they are relevant to layout, art elements, both, or neither, and/or whether a particular draft literature mode is identified.

Still referring to FIG. 1, in some embodiments, art modification machine learning model 176 may include a language model used to interpret template feedback 160 and extract desired features from this data as described above. Processor 104 may then determine a layout template by applying these features to an identified draft art element. For example, if a language model interprets template feedback 160 as identifying a particular draft art element, and interprets template feedback 160 as suggesting more saturation, then processor 104 may determine literature mode 164 including art element with more saturation. Several such processor 104 functions may be designed in order to conform to popular user requests. For example, such functions may be used to modify brightness, modify saturation, modify contrast, modify resolution, modify size, and the like.

Still referring to FIG. 1, in some embodiments, apparatus 100 may generate literature content. Methods of generating literature content may be consistent with any methods of generating literature content disclosed in U.S. patent application Ser. No. 18/367,738, filed on Sep. 13, 2023, and titled "APPARATUS AND METHOD FOR GENERATION OF AN INTEGRATED DATA FILE," the entirety of which is hereby incorporated by reference. For example, apparatus 100 may generate literature content using a generative machine learning model.

Still referring to FIG. 1, in some embodiments, apparatus 100 may combine literature content and literature mode 164 to create a work of literature. In some embodiments, apparatus 100 may combine literature content and a layout template to create a work of literature. In some embodiments, apparatus 100 may combine literature content and an art element to create a work of literature.

Still referring to FIG. 1, in some embodiments, apparatus 100 may communicate literature mode 164 and/or a work of literature to user. This may be done as described above with respect to communicating inquiry 132 to user. For example, apparatus 100 may transmit a signal including literature mode 164 and/or a work of literature to user device 124, and the signal may configure user device 124 to communicate a literature mode 164 and/or a work of literature to user. User device 124 may communicate literature mode 164 and/or a work of literature to user using, for example, a visual format. For example, user device 124 may communicate literature mode 164 and/or a work of literature to user by displaying one or more visual elements depicting literature mode 164 and/or a work of literature.

Still referring to FIG. 1, in some embodiments, a visual element data structure may include a visual element. As used herein, a "visual element" is a datum that is displayed visually to a user. In some embodiments, a visual element data structure may include a rule for displaying visual element. In some embodiments, a visual element data structure may be determined as a function of inquiry 132, plurality of draft literature modes 144, literature mode 164, and/or an element that makes up an item from this list. In a non-limiting example, a visual element data structure may be generated such that visual element depicting an art element may be displayed to a user. In another non-limiting example, a visual element depicting an exemplary page from a draft layout template may be displayed to a user. In another non-limiting example, a visual element depicting inquiry 132 may be displayed to a user.

Still referring to FIG. 1, in some embodiments, visual element may include one or more elements of text, images, shapes, charts, particle effects, interactable features, and the like. For example, apparatus 100 may display to user visual elements depicting a plurality of draft art elements, along with additional visual elements which serve as interactable buttons for selecting specific art elements.

Still referring to FIG. 1, a visual element data structure may include rules governing if or when visual element is displayed. In a non-limiting example, a visual element data structure may include a rule causing a visual element describing inquiry 132, plurality of draft literature modes 144, and/or literature mode 164 to be displayed when a user selects inquiry 132, plurality of draft literature modes 144, and/or literature mode 164 using a GUI.

Still referring to FIG. 1, a visual element data structure may include rules for presenting more than one visual element, or more than one visual element at a time. In an embodiment, about 1, 2, 3, 4, 5, 10, 20, or 50 visual elements are displayed simultaneously.

Still referring to FIG. 1, a visual element data structure rule may apply to a single visual element or datum, or to more than one visual element or datum. A visual element data structure may categorize data into one or more categories and may apply a rule to all data in a category, to all data in an intersection of categories, or all data in a subsection of a category (such as all data in a first category and not in a second category). For example, a first set of rules may apply to all visual elements which depict draft art elements and a second set of rules may apply to all visual elements which depict layout templates. A visual element data structure may rank data or assign numerical values to them. A numerical value may, for example, measure the degree to which a first datum is associated with a category or with a second datum. A visual element data structure may apply rules based on a comparison between a ranking or numerical value and a threshold. For example, a first visual element indicating insufficient data may be displayed if a certainty score is too low, and a second visual element indicating sufficient data may be displayed if a certainty score is sufficiently high.

Rankings, numerical values, categories, and the like may be used to set visual element data structure rules. Similarly, rankings, numerical values, categories, and the like may be applied to visual elements, and visual elements may be applied based on them.

Still referring to FIG. 1, in some embodiments, visual element may be interacted with. For example, visual element may include an interface, such as a button or menu. In some embodiments, visual element may be interacted with using a user device such as a smartphone.

Still referring to FIG. 1, in some embodiments, apparatus 100 may transmit visual element data structure to user device 124. In some embodiments, apparatus 100 may include at least a processor 104 and a memory 108 communicatively connected to the at least processor 104, the memory 108 containing instructions 112 configuring the at least processor 104 to transmit visual element data structure to user device 124. In some embodiments, visual element data structure may configure user device 124 to display visual element. In some embodiments, visual element data structure may cause an event handler to be triggered in an application of user device 124 such as a web browser. In some embodiments, triggering of an event handler may cause a change in an application of user device 124 such as display of visual element.

Still referring to FIG. 1, in some embodiments, apparatus 100 may transmit visual element to a display. A display may communicate visual element to user. A display may include, for example, a smartphone screen, a computer screen, or a tablet screen. A display may be configured to provide a visual interface. A visual interface may include one or more virtual interactive elements such as, without limitation, buttons, menus, and the like. A display may include one or more physical interactive elements, such as buttons, a computer mouse, or a touchscreen, that allow user to input data into the display. Interactive elements may be configured to enable interaction between a user and a computing device. In some embodiments, a visual element data structure is determined as a function of data input by user into a display.

Still referring to FIG. 1, a variable and/or datum described herein may be represented as a data structure. In some embodiments, a data structure may include one or more functions and/or variables, as a class might in object-oriented programming. In some embodiments, a data structure may include data in the form of a Boolean, integer, float, string, date, and the like. In a non-limiting example, an inquiry response data structure may include a string value representing the text of the inquiry response. In some embodiments, data in a data structure may be organized in a linked list, tree, array, matrix, tenser, and the like. In a non-limiting example, machine learning training data may be organized in an array. In some embodiments, a data structure may include or be associated with one or more elements of metadata. A data structure may include one or more self-referencing data elements, which processor 104 may use in interpreting the data structure. In a non-limiting example, a data structure may include "<date>" and "</date>," tags, indicating that the content between the tags is a date.

Still referring to FIG. 1, a data structure may be stored in, for example, memory 108 or a database. Database may be implemented, without limitation, as a relational database, a key-value retrieval database such as a NOSQL database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

Still referring to FIG. 1, in some embodiments, a data structure may be read and/or manipulated by processor 104. In a non-limiting example, an inquiry response data structure may be read and transcribed using an automatic speech recognition system.

Still referring to FIG. 1, in some embodiments, a data structure may be calibrated. In some embodiments, a data structure may be trained using a machine learning algorithm. In a non-limiting example, a data structure may include an array of data representing the biases of connections of a neural network. In this example, the neural network may be trained on a set of training data, and a back propagation algorithm may be used to modify the data in the array. Machine learning models and neural networks are described further herein.

Figure 2:
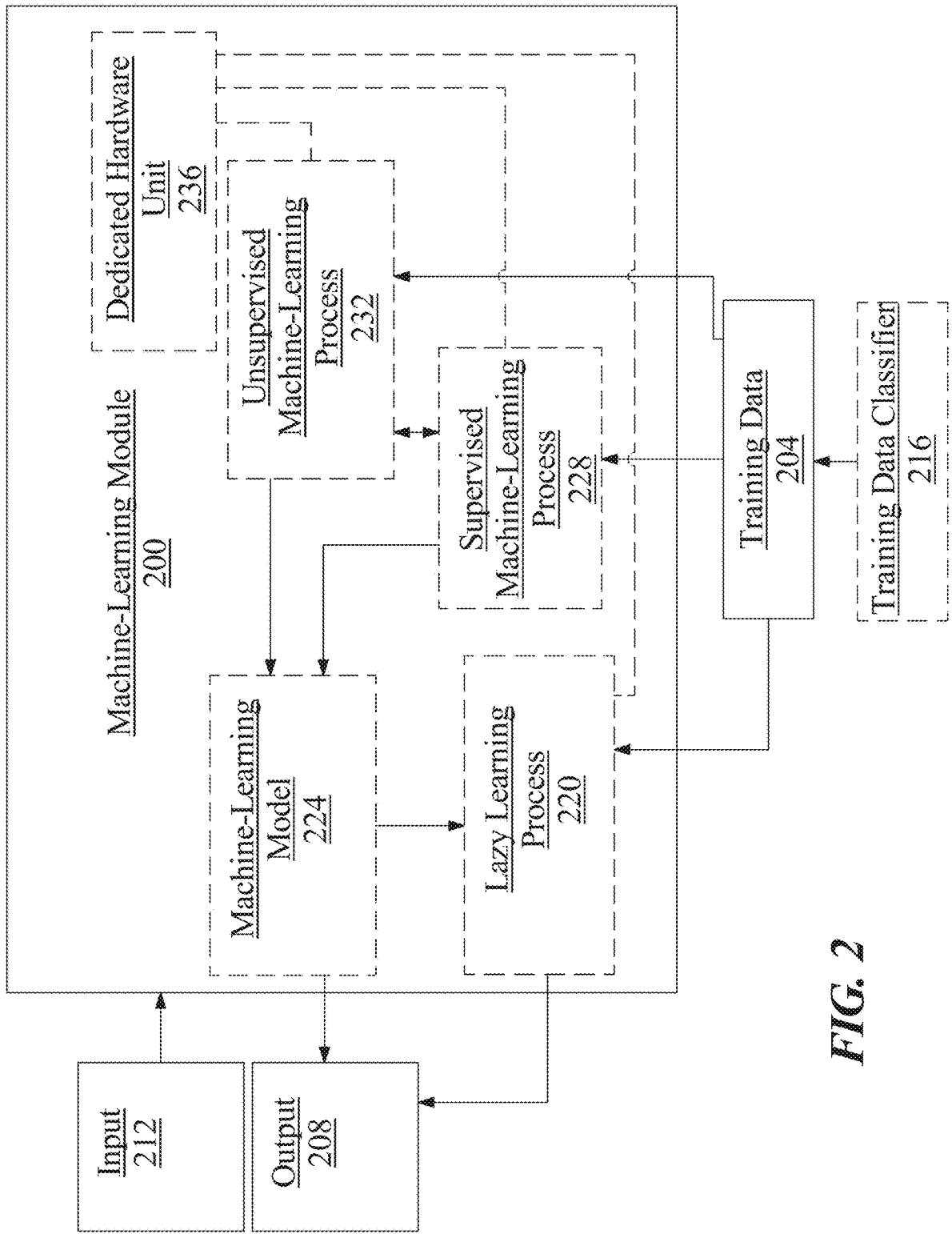
FIG. 2 is a diagram depicting an exemplary machine learning model.

Referring now to FIG. 2, an exemplary embodiment of a machine-learning module 200 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 204 to generate an algorithm instantiated in hardware or software logic, data structures, and/or functions that will be performed by a computing device/module to produce outputs 208 given data provided as inputs 212; this is in contrast to a non-machine learning software program where the commands to be executed are determined in advance by a user and written in a programming language.

Still referring to FIG. 2, "training data," as used herein, is data containing correlations that a machine-learning process may use to model relationships between two or more categories of data elements. For instance, and without limitation, training data 204 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 204 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 204 according to various correlations; correlations may indicate causative and/or predictive links between categories of data elements, which may be modeled as relationships such as mathematical relationships by machine-learning processes as described in further detail below. Training data 204 may be formatted and/or organized by categories of data elements, for instance by associating data elements with one or more descriptors corresponding to categories of data elements. As a non-limiting example, training data 204 may include data entered in standardized forms by persons or processes, such that entry of a given data element in a given field in a form may be mapped to one or more descriptors of categories. Elements in training data 204 may be linked to descriptors of categories by tags, tokens, or other data elements; for instance, and without limitation, training data 204 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 2, training data 204 may include one or more elements that are not categorized; that is, training data 204 may not be formatted or contain descriptors for some elements of data. Machine-learning algorithms and/or other processes may sort training data 204 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 204 to be made applicable for two or more distinct machine-learning algorithms as described in further detail below. Training data 204 used by machine-learning module 200 may correlate any input data as described in this disclosure to any output data as described in this disclosure. As a non-limiting illustrative example, an input may include characterization datum 120 and an output may include inquiry 132.

Further referring to FIG. 2, training data may be filtered, sorted, and/or selected using one or more supervised and/or unsupervised machine-learning processes and/or models as described in further detail below; such models may include without limitation a training data classifier 216. Training data classifier 216 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 200 may generate a classifier using a classification algorithm, defined as a processes whereby a computing device and/or any module and/or component operating thereon derives a classifier from training data 204. Classification may be performed using, without limitation, linear classifiers such as without limitation logistic regression and/or naïve Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 216 may classify elements of training data to whether they are associated with high certainty scores.

With further reference to FIG. 2, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Still referring to FIG. 2, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value.

As a non-limiting example, and with further reference to FIG. 2, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 2, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 2, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Still referring to FIG. 2, machine-learning module 200 may be configured to perform a lazy-learning process 220 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 204. Heuristic may include selecting some number of highest-ranking associations and/or training data 204 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 2, machine-learning processes as described in this disclosure may be used to generate machine-learning models 224. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 224 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 224 may be generated by creating an artificial neural network, such as a convolutional neural network comprising an input layer of nodes, one or more intermediate layers, and an output layer of nodes. Connections between nodes may be created via the process of "training" the network, in which elements from a training data 204 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 2, machine-learning algorithms may include at least a supervised machine-learning process 228. At least a supervised machine-learning process 228, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include characterization datum 120 as described above as inputs, inquiry 132 as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 204. Persons skilled in the art, upon reviewing the entirety of this disclosure, will be aware of various possible variations of at least a supervised machine-learning process 228 that may be used to determine relation between inputs and outputs. Supervised machine-learning processes may include classification algorithms as defined above.

With further reference to FIG. 2, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 2, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 2, machine learning processes may include at least an unsupervised machine-learning processes 232. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 232 may not require a response variable; unsupervised processes 232 may be used to find interesting patterns and/or inferences between variables, to determine a degree of correlation between two or more variables, or the like.

Still referring to FIG. 2, machine-learning module 200 may be designed and configured to create a machine-learning model 224 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 2, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 2, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 2, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 2, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 2, one or more processes or algorithms described above may be performed by at least a dedicated hardware unit 236. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 236 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 236 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 236 to perform one or more operations described herein, such as evaluation of model and/or algorithm outputs, one-time or iterative updates to parameters, coefficients, weights, and/or biases, and/or any other operations such as vector and/or matrix operations as described in this disclosure.

With continued reference to FIG. 2, apparatus 100 may use user feedback to train the machine-learning models and/or classifiers described above. For example, classifier may be trained using past inputs and outputs of classifier. In some embodiments, if user feedback indicates that an output of classifier was "bad," then that output and the corresponding input may be removed from training data used to train classifier, and/or may be replaced with a value entered by, e.g., another user that represents an ideal output given the input the classifier originally received, permitting use in retraining, and adding to training data; in either case, classifier may be retrained with modified training data as described in further detail below. In some embodiments, training data of classifier may include user feedback.

With continued reference to FIG. 2, in some embodiments, an accuracy score may be calculated for classifier using user feedback. For the purposes of this disclosure, "accuracy score," is a numerical value concerning the accuracy of a machine-learning model. For example, a plurality of user feedback scores may be averaged to determine an accuracy score. In some embodiments, a cohort accuracy score may be determined for particular cohorts of persons. For example, user feedback for users belonging to a particular cohort of persons may be averaged together to determine the cohort accuracy score for that particular cohort of persons and used as described above. Accuracy score or another score as described above may indicate a degree of retraining needed for a machine-learning model such as a classifier; apparatus 100 may perform a larger number of retraining cycles for a higher number (or lower number, depending on a numerical interpretation used), and/or may collect more training data for such retraining, perform more training cycles, apply a more stringent convergence test such as a test requiring a lower mean squared error, and/or indicate to a user and/or operator that additional training data is needed.

Figure 3:
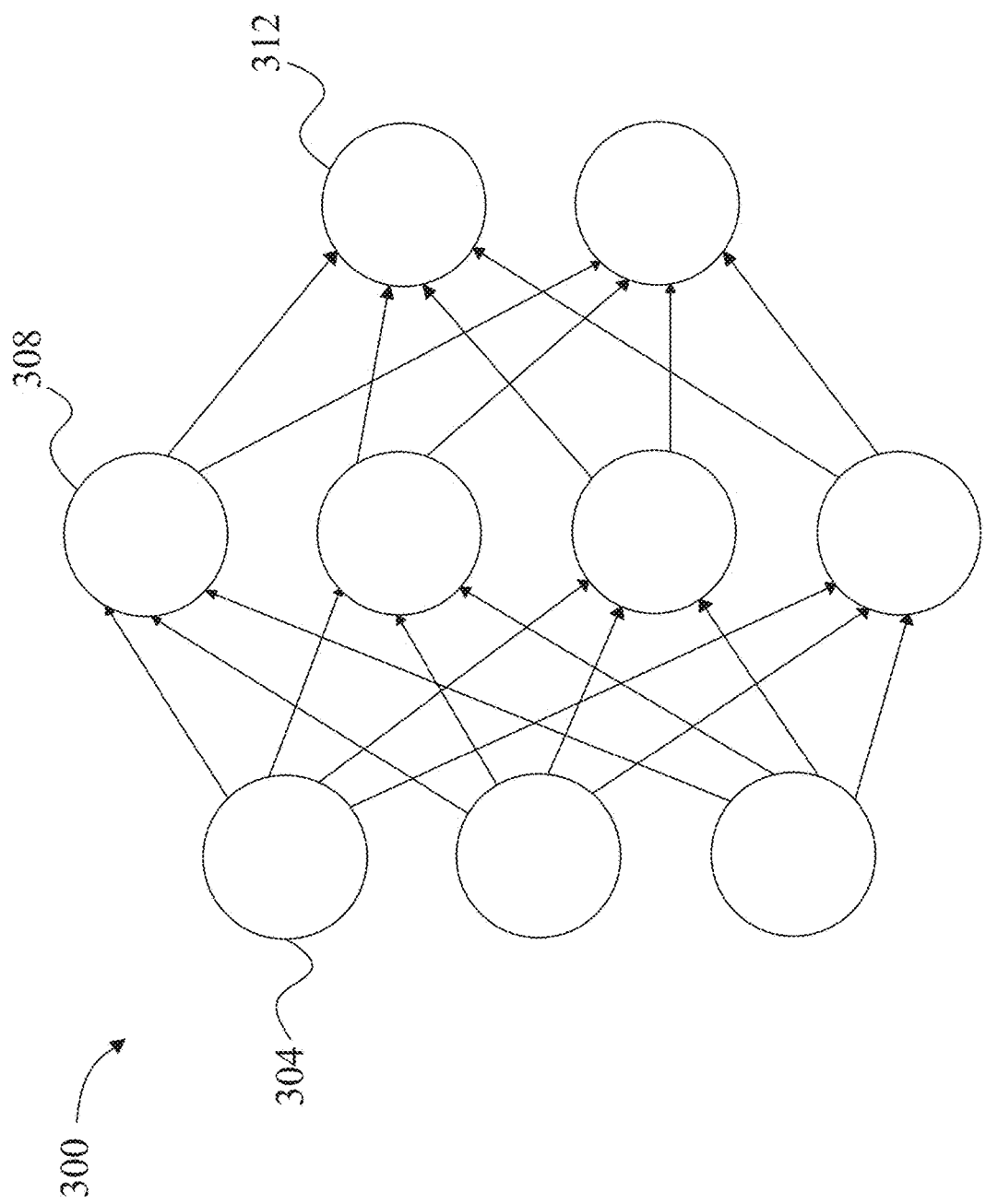
FIG. 3 is a diagram depicting an exemplary neural network.

Referring now to FIG. 3, an exemplary embodiment of neural network 300 is illustrated. A neural network 300 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 304, one or more intermediate layers 308, and an output layer of nodes 312. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 4:
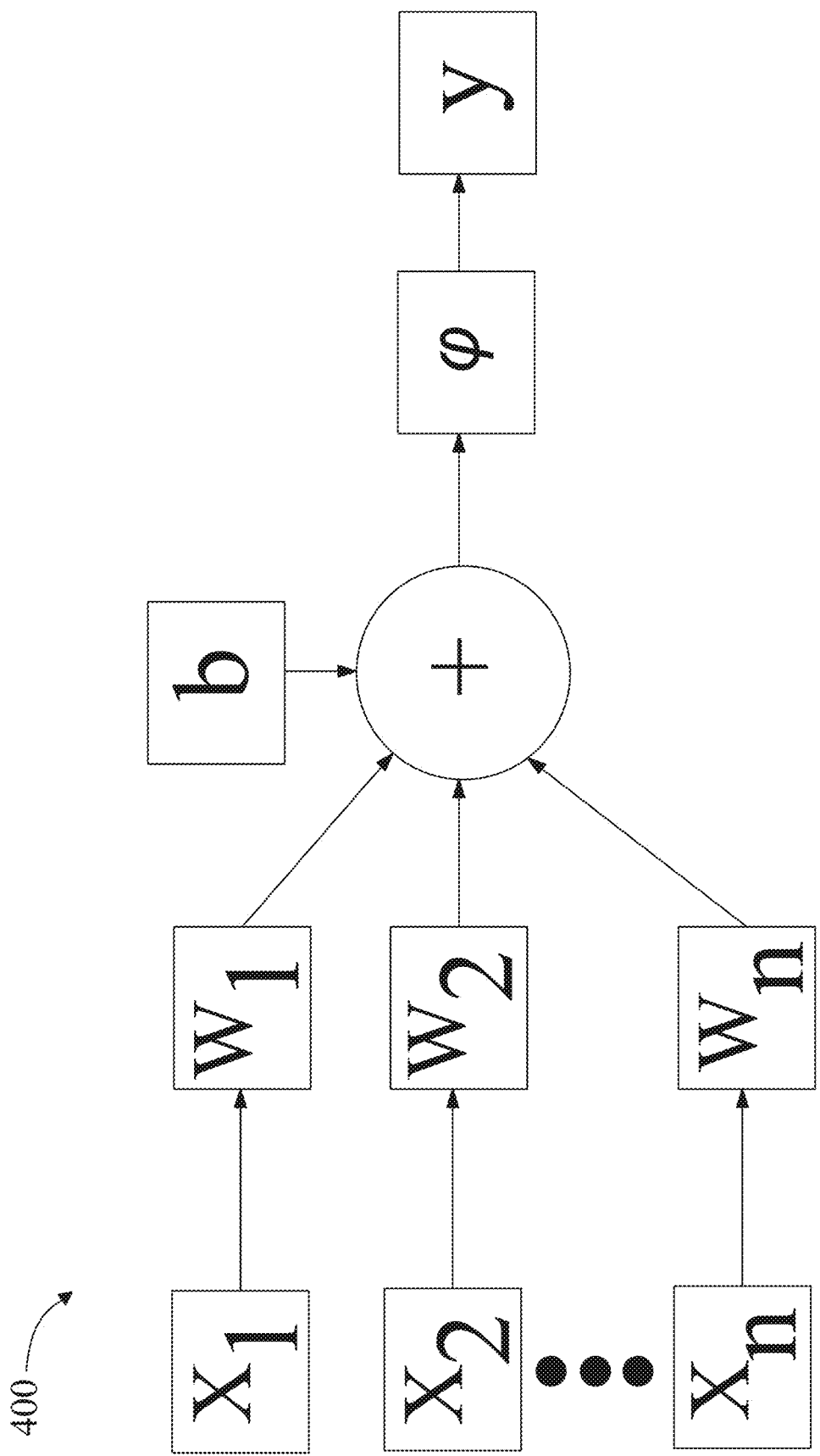
FIG. 4 is a diagram depicting an exemplary neural network node.

Referring now to FIG. 4, an exemplary embodiment of a node 400 of a neural network is illustrated. A node may include, without limitation a plurality of inputs xi that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1-e^{-x}}$$

given input x, a tanh (hyperbolic tangent) function, of the form $$\frac{e^x - e^{-x}}{e^x + e^{-x}},$$

a tanh derivative function such as ƒ(x)=tanh²(x), a rectified linear unit function such as ƒ(x)=max (0, x), a "leaky" and/or "parametric" rectified linear unit function such as ƒ(x)=max (αx, x) for some α, an exponential linear units function such as ƒ(x)={x for x≥0/α(e$^x$–1 for x<0 for x<0 for some value of α (this function may be replaced and/or weighted by its own derivative in some embodiments), a softmax function such as $$f(x_i) = \frac{e^x}{\sum_i x_i}$$

where the inputs to an instant layer are $x_i$, a swish function such as ƒ(x)=x * sigmoid(x), a Gaussian error linear unit function such as f(x)=α(1+tanh ($\sqrt{2/\pi}$(x+bx$^r$))) for some values of a, b, and r, and/or a scaled exponential linear unit function such as ƒ(x)=λαe$^x$–1) for x<0/x for x≥0. Fundamentally, there is no limit to the nature of functions of inputs xi that may be used as activation functions. As a non-limiting and illustrative example, node may perform a weighted sum of inputs using weights $w_i$ that are multiplied by respective inputs x. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input xi may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Still referring to FIG. 4, a "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like. CNN may include, without limitation, a deep neural network (DNN) extension, where a DNN is defined as a neural network with two or more hidden layers.

Still referring to FIG. 4, in some embodiments, a convolutional neural network may learn from images. In non-limiting examples, a convolutional neural network may perform tasks such as classifying images, detecting objects depicted in an image, segmenting an image, and/or processing an image. In some embodiments, a convolutional neural network may operate such that each node in an input layer is only connected to a region of nodes in a hidden layer. In some embodiments, the regions in aggregate may create a feature map from an input layer to the hidden layer. In some embodiments, a convolutional neural network may include a layer in which the weights and biases for all nodes are the same. In some embodiments, this may allow a convolutional neural network to detect a feature, such as an edge, across different locations in an image.

Figure 5:
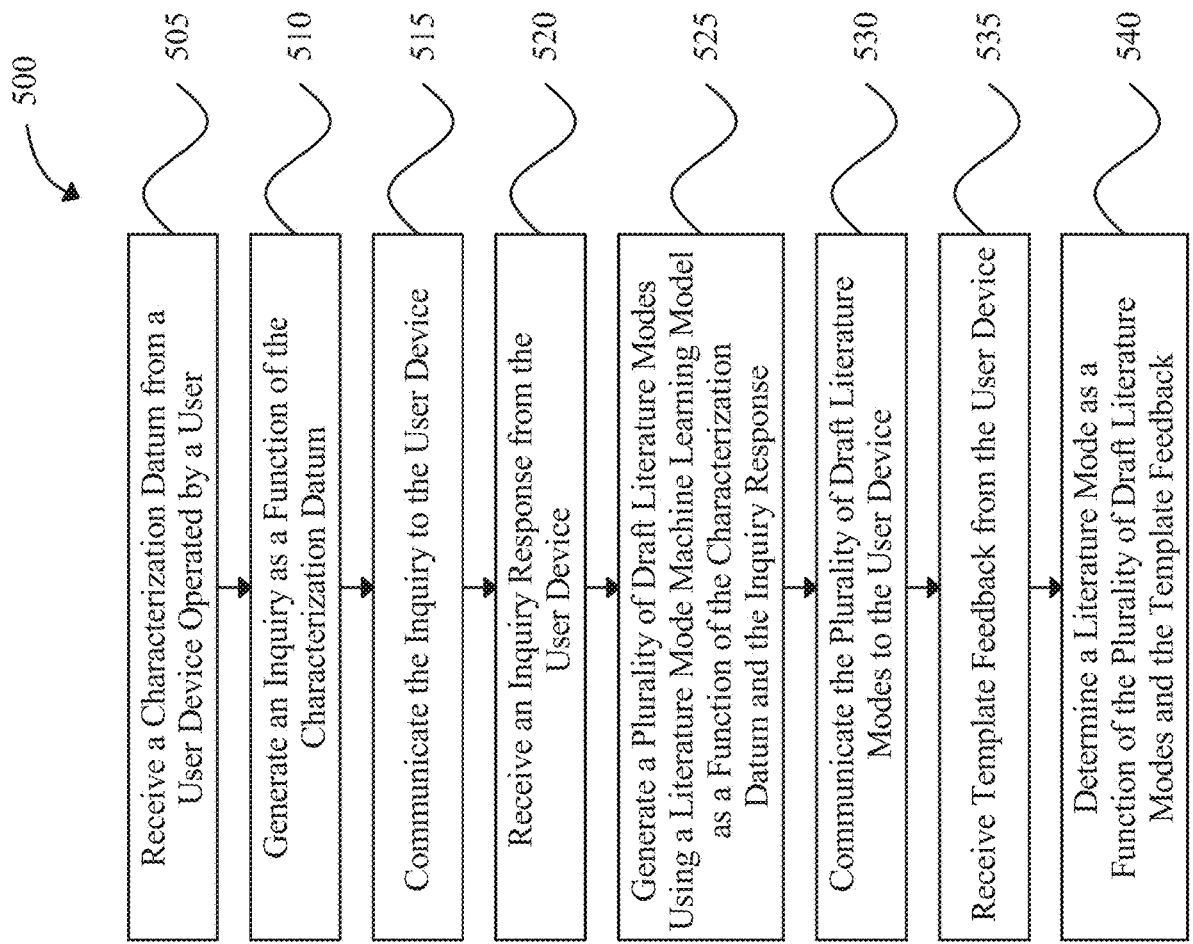
FIG. 5 is a diagram depicting an exemplary method of generative machine-learning guided by modal classification.

Referring to FIG. 5, an exemplary embodiment of α method 500 of generative machine-learning guided by modal classification is illustrated. One or more steps if method 500 may be implemented, without limitation, as described above in reference to FIG. 1. One or more steps of method 500 may be implemented, without limitation, using at least a processor.

Still referring to FIG. 5, in some embodiments, method 500 may include receiving a characterization datum from a user 505.

Still referring to FIG. 5, in some embodiments, method 500 may include generating an inquiry as a function of the characterization datum 510. In some embodiments, generating the inquiry may include training an inquiry machine learning model on a training dataset including model text characterization data, associated with model inquiries; inputting into the inquiry machine learning model the characterization datum; and receiving as an output from the inquiry machine learning model the inquiry.

Still referring to FIG. 5, in some embodiments, method 500 may include communicating the inquiry to the user 515.

Still referring to FIG. 5, in some embodiments, method 500 may include receiving an inquiry response 520.

Still referring to FIG. 5, in some embodiments, method 500 may include generating a plurality of draft literature modes using a literature mode machine learning model as a function of the characterization datum and the inquiry response 525. In some embodiments, generating the plurality of literature modes may include training a layout template machine learning model on a training dataset including model text characterization data and model inquiry responses, associated with model draft layout templates; inputting into the layout template machine learning model the characterization datum and the inquiry response; and receiving as an output from the layout template machine learning model a draft layout template. In some embodiments, generating the plurality of literature modes may include training an art element machine learning model on a training dataset including model text characterization data and model inquiry responses, associated with model draft layout templates; inputting into the layout template machine learning model the characterization datum and the inquiry response; and receiving as an output from the art element machine learning model a draft art element.

Still referring to FIG. 5, in some embodiments, method 500 may include communicating the plurality of draft literature modes to the user 530.

Still referring to FIG. 5, in some embodiments, method 500 may include receiving template feedback from the user 535.

Still referring to FIG. 5, in some embodiments, method 500 may include determining a literature mode as a function of the plurality of draft literature modes and the template feedback 540. In some embodiments, determining the literature mode may include training a layout modification machine learning model on a training dataset including model draft layout templates and model template feedback, associated with model layout templates; inputting into the layout template machine learning model the plurality of draft literature modes and the template feedback; and receiving as an output from the layout template machine learning model a layout template. In some embodiments, determining the literature mode may include training an art modification machine learning model on a training dataset including model draft art elements and model template feedback, associated with model art elements; inputting into the layout template machine learning model the plurality of draft literature modes and the template feedback; and receiving as an output from the layout template machine learning model an art element. In some embodiments, determining the literature mode comprises selecting the literature mode from the plurality of draft literature modes.

Still referring to FIG. 5, in some embodiments, receiving the characterization datum from the user may include receiving the characterization datum from a user device; communicating the inquiry to the user may include transmitting to the user device a signal configuring the user device to display the inquiry; receiving the inquiry response from the user may include receiving the inquiry response from the user device; communicating the plurality of draft literature modes to the user may include transmitting to the user device a signal configuring the user device to display the plurality of draft literature modes; and receiving the template feedback from the user may include receiving the template feedback from the user device. In some embodiments, receiving the characterization datum from the user, communicating the inquiry to the user, receiving the inquiry response from the user, communicating the plurality of draft literature modes to the user; and receiving the template feedback from the user are each done using a chatbot.

Still referring to FIG. 5, in some embodiments, method 500 may further include generating literature content; and combining the literature content and the literature mode to create a work of literature.

Figure 6:
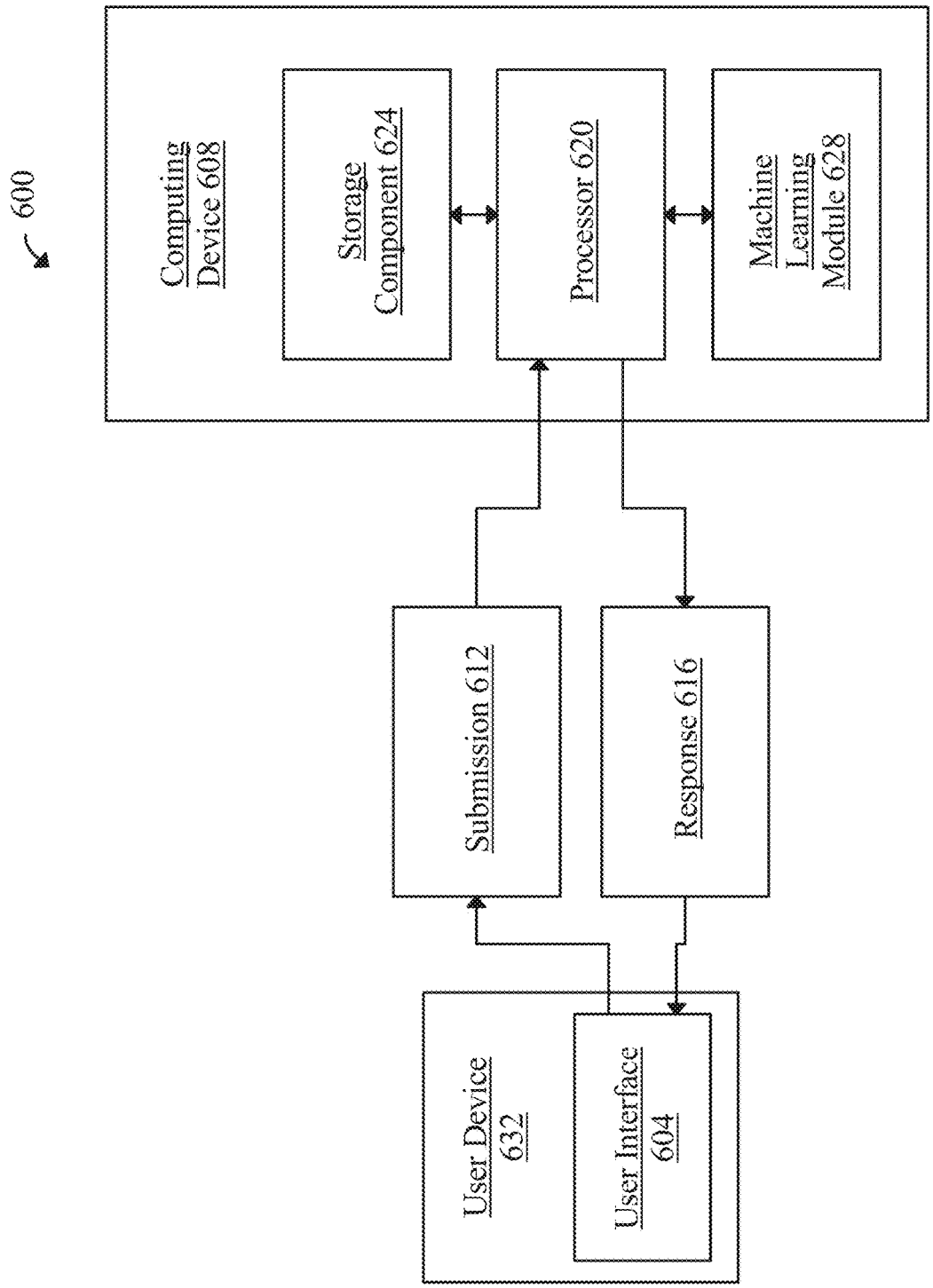
FIG. 6 is a diagram depicting an exemplary chatbot.

Now referring to FIG. 6, in some embodiments, apparatus 100 may communicate with user and/or instructor using a chatbot. According to some embodiments, user interface 604 on user device 632 may be communicative with a computing device 608 that is configured to operate a chatbot. In some embodiments, user interface 604 may be local to user device 632. In some embodiments, user interface 604 may be local to computing device 608. Alternatively, or additionally, in some cases, user interface 604 may remote to user device 632 and communicative with user device 632, by way of one or more networks, such as without limitation the internet. Alternatively, or additionally, one or more user interfaces may communicate with computing device 608 using telephonic devices and networks, such as without limitation fax machines, short message service (SMS), or multimedia message service (MMS). Commonly, user communicate with computing device 608 using text-based communication, for example without limitation using a character encoding protocol, such as American Standard for Information Interchange (ASCII). Typically, user interfaces conversationally interface with a chatbot, by way of at least a submission, from a user interface to the chatbot, and a response, from the chatbot to the user interface. For example, user interface 604 may interface with a chatbot using submission 612 and response 616. In some embodiments, submission 612 and/or response 616 may use text-based communication. In some embodiments, submission 612 and/or response 616 may use audio communication.

Still referring to FIG. 6, submission 612, once received by computing device 608 operating a chatbot, may be processed by a processor 620. In some embodiments, processor 620 processes submission 612 using one or more of keyword recognition, pattern matching, and natural language processing. In some embodiments, processor employs real-time learning with evolutionary algorithms. In some cases, processor 620 may retrieve a pre-prepared response from at least a storage component 624, based upon submission 612. Alternatively or additionally, in some embodiments, processor 620 communicates a response 616 without first receiving a submission, thereby initiating conversation. In some cases, processor 620 communicates an inquiry to user interface 604; and processor 620 is configured to process an answer to the inquiry in a following submission from the user interface. In some cases, an answer to an inquiry present within a submission from a user device may be used by computing device 608 as an input to another function. In some embodiments, computing device 608 may include machine learning module 628. Machine learning module 628 may include any machine learning models described herein. In some embodiments, submission 612 may be input into a trained machine learning model within machine learning module 628. In some embodiments, submission 612 may undergo one or more processing steps before being input into a machine learning model. In some embodiments, submission 612 may be used to train a machine learning model within machine learning module 628.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
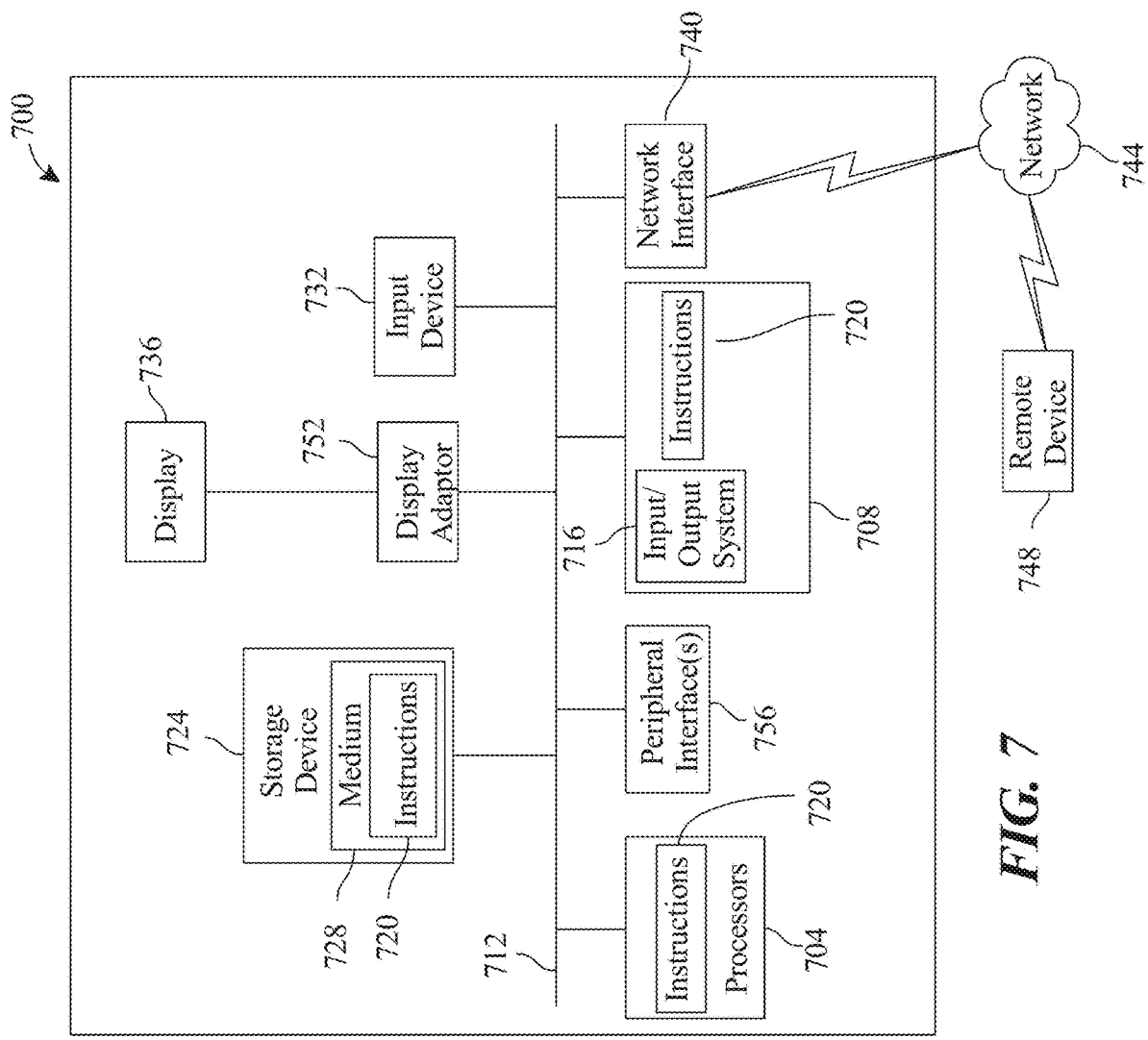
FIG. 7 is a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of α peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for generative machine-learning guided by modal classification, the apparatus comprising:
   at least a processor; and
   a memory communicatively connected to the at least processor, the memory containing instructions configuring the at least processor to:
      receive a characterization datum from a user device operated by a user;
      generate an inquiry as a function of the characterization datum;
      communicate the inquiry to the user device;
      receive an inquiry response from the user device;
      generate a plurality of draft literature modes using a literature mode machine learning model as a function of the characterization datum and the inquiry response, wherein using the literature mode machine learning model comprises:
         training an art element machine learning model on a training dataset including example text characterization data and example inquiry responses, associated with example draft layout templates;
         inputting into the layout template machine learning model the characterization datum and the inquiry response;
         receiving as an output from the art element machine learning model a draft art element;
         receiving user feedback on the draft art element;
         determining an accuracy score of the art element machine learning model based on the user feedback,
         generating an updated training dataset based on the accuracy score; and
         iteratively retraining the art element machine learning model using the updated training dataset;
      communicate the plurality of draft literature modes to the user device;
      receive template feedback from the user device; and
      output a literature mode as a function of the plurality of draft literature modes and the template feedback.

2. The apparatus of claim 1, wherein communicating the inquiry to the user device comprises transmitting to the user device a signal configuring the user device to display to the user the inquiry.

3. The apparatus of claim 1, wherein generating the inquiry comprises:
   training an inquiry machine learning model on a training dataset including example text characterization data, associated with example inquiries;
   inputting into the inquiry machine learning model the characterization datum; and
   receiving as an output from the inquiry machine learning model the inquiry.

4. The apparatus of claim 1, wherein generating the plurality of literature modes comprises:
   training a layout template machine learning model on a training dataset including example text characterization data and example inquiry responses, associated with example draft layout templates;
   inputting into the layout template machine learning model the characterization datum and the inquiry response; and
   receiving as an output from the layout template machine learning model a draft layout template.

5. The apparatus of claim 1, wherein outputting the literature mode comprises:
   training a layout modification machine learning model on a training dataset including example draft layout templates and example template feedback, associated with example layout templates;
   inputting into the layout template machine learning model the plurality of draft literature modes and the template feedback; and
   receiving as an output from the layout template machine learning model a layout template.

6. The apparatus of claim 1, wherein outputting the literature mode comprises:
   training an art modification machine learning model on a training dataset including example draft art elements and example template feedback, associated with example art elements;
   inputting into the layout template machine learning model the plurality of draft literature modes and the template feedback; and
   receiving as an output from the layout template machine learning model an art element.

7. The apparatus of claim 1, wherein outputting the literature mode comprises selecting the literature mode from the plurality of draft literature modes.

8. The apparatus of claim 1, wherein the memory contains instructions configuring the at least processor to:
   generate literature content using a generative machine learning model; and
   combine the literature content and the literature mode to create a work of literature.

9. The apparatus of claim 1, wherein receiving the characterization datum from the user device further comprises receiving the characterization datum from the user using a chatbot.

10. A method for generative machine-learning guided by modal classification, the apparatus comprising:
- using at least a processor, receiving a characterization datum from a user device operated by a user;
- using at least a processor, generating an inquiry as a function of the characterization datum;
- using at least a processor, communicating the inquiry to the user device;
- using at least a processor, receiving an inquiry response from the user device;
- using at least a processor, generating a plurality of draft literature modes using a literature mode machine learning model as a function of the characterization datum and the inquiry response, wherein using the literature mode machine learning model comprises:
  - training an art element machine learning model on a training dataset including example text characterization data and example inquiry responses, associated with example draft layout templates;
  - inputting into the layout template machine learning model the characterization datum and the inquiry response;
  - receiving as an output from the art element machine learning model a draft art element;
  - receiving user feedback on the draft art element;
  - determining an accuracy score of the art element machine learning model based on the user feedback,
  - generating an updated training dataset based on the accuracy score; and
  - iteratively retraining the art element machine learning model using the updated training dataset,
- using at least a processor, communicating the plurality of draft literature modes to the user device;
- using at least a processor, receiving template feedback from the user device; and
- using at least a processor, outputting a literature mode as a function of the plurality of draft literature modes and the template feedback.

11. The method of claim 10, wherein communicating the inquiry to the user device comprises transmitting to the user device a signal configuring the user device to display to the user the inquiry.

12. The method of claim 10, wherein generating the inquiry comprises:
- training an inquiry machine learning model on a training dataset including example text characterization data, associated with example inquiries;
- inputting into the inquiry machine learning model the characterization datum; and
- receiving as an output from the inquiry machine learning model the inquiry.

13. The method of claim 10, wherein generating the plurality of literature modes comprises:
- training a layout template machine learning model on a training dataset including example text characterization data and example inquiry responses, associated with example draft layout templates;
- inputting into the layout template machine learning model the characterization datum and the inquiry response; and
- receiving as an output from the layout template machine learning model a draft layout template.

14. The method of claim 10, wherein outputting the literature mode comprises:
- training a layout modification machine learning model on a training dataset including example draft layout templates and example template feedback, associated with example layout templates;
- inputting into the layout template machine learning model the plurality of draft literature modes and the template feedback; and
- receiving as an output from the layout template machine learning model a layout template.

15. The method of claim 10, wherein outputting the literature mode comprises:
- training an art modification machine learning model on a training dataset including example draft art elements and example template feedback, associated with example art elements;
- inputting into the layout template machine learning model the plurality of draft literature modes and the template feedback; and
- receiving as an output from the layout template machine learning model an art element.

16. The method of claim 10, wherein outputting the literature mode comprises selecting the literature mode from the plurality of draft literature modes.

17. The method of claim 10, further comprising:
- using at least a processor, generating literature content using a generative machine learning model; and
- using at least a processor, combining the literature content and the literature mode to create a work of literature.

18. The method of claim 10, wherein receiving the characterization datum from the user device further comprises receiving the characterization datum from the user using a chatbot.

* * * * *